United States Patent
Hayakawa et al.

(10) Patent No.: US 6,514,622 B1
(45) Date of Patent: Feb. 4, 2003

(54) SANITARY EARTHEN PRODUCTS

(75) Inventors: Makoto Hayakawa, Kitakyushu (JP); Koichi Hayashi, Kitakyushu (JP); Masami Ando, Kitakyushu (JP); Masaaki Ito, Kitakyushu (JP); Tomoyasu Ichiki, Kitakyushu (JP); Hirotaka Ishibashi, Kitakyushu (JP); Mitsuyoshi Machida, Kitakyushu (JP)

(73) Assignee: Toto Ltd., Fukuoka-Ken (JP)

(*) Notice: Subject to any disclaimer, the term of this patent is extended or adjusted under 35 U.S.C. 154(b) by 0 days.

(21) Appl. No.: 09/762,144

(22) PCT Filed: Nov. 26, 1999

(86) PCT No.: PCT/JP99/06621

§ 371 (c)(1), (2), (4) Date: Jun. 4, 2001

(87) PCT Pub. No.: WO00/35833

PCT Pub. Date: Jun. 22, 2000

(30) Foreign Application Priority Data

Dec. 11, 1998 (JP) .......................... 10-353113
Dec. 26, 1998 (JP) .......................... 10-376741
Aug. 18, 1999 (JP) .......................... 11-231305
Sep. 9, 1999 (JP) .......................... 11-255824

(51) Int. Cl.[7] .......................... B32B 15/04; B32B 9/04
(52) U.S. Cl. .......................... 428/432; 428/689; 4/662
(58) Field of Search .......................... 4/662, 301, 307

(56) References Cited

FOREIGN PATENT DOCUMENTS

| | | |
|---|---|---|
| EP | 0565880 | 10/1993 |
| JP | 55075741 | 6/1980 |
| JP | 08100274 | 4/1996 |
| JP | 0 808 570 A1 * | 11/1997 |
| JP | 0 653 161 B1 * | 1/1998 |
| JP | 10337477 | 12/1998 |

* cited by examiner

Primary Examiner—Deborah Jones
Assistant Examiner—G. A. Blackwell-Rudasill
(74) Attorney, Agent, or Firm—Jones, Day, Reavis & Pogue

(57) ABSTRACT

Disclosed is a sanitary ware which has a self-cleaning function for releasing carboxyl-containing greasy stains or soils, such as fatty acids, fatty esters, metallic soaps (scum of soaps), proteins, amino acids, bacteria, and fungi, and deposited stains or soils, such as water scale and urinary calculi. This sanitary ware comprises at least a sanitary ware body and a glaze layer as an outermost layer of the sanitary ware, a monovalent metal component and/or a metal component having a measure of the electronegativity based on Pouling's rule of not more than 1 being provided so as to be releasable evenly and continuously, over the whole surface of the glaze layer as the outermost layer, in such an amount large enough to impart a self-cleaning function for releasing stains or soils to the surface of the glaze layer as the outermost layer, the metal component being suppliable from the glaze layer as the outermost layer and/or the sanitary ware body to the whole surface of the outermost layer. The sanitary ware is advantageous in that stains or soils on the sanitary ware can be simply removed, for example, by running water without using any surfactant and without strongly scrubbing the surface of the sanitary ware by a scrubbing brush or a cleaning brush.

49 Claims, 6 Drawing Sheets

SANITARY EARTHEN PRODUCTS

This application claims the benefit of International Application No. PCT/JP99/06621, which has the international filing date of Nov. 26, 1999, and which was not published under PCT Article 21(2) in English.

BACKGROUND OF THE INVENTION

1. Field of the Invention

The present invention relates to sanitary wares, such as toilets, urinals, strainers for urinals, flush tanks for toilets or urinals, washbowls in washstands, or wash hand basins.

2. Background Art

Good appearance and high cleanness are important for the surface of sanitary wares from the viewpoints of hygiene and aesthetic effect. Further, retention of good appearance and high cleanness for a long period of time is preferred.

In order to keep the surface of sanitary wares clean and to retain good appearance of the surface of sanitary wares, it is a common practice to strongly scrub the surface thereof by a scrubbing brush or a cleaning brush containing a detergent, such as a surfactant, an acid detergent, or an alkali detergent. Specifically, stains or soils deposited on the surface of sanitary wares are removed through utilization of chemical detergency derived from the detergent and through utilization of physical cleaning action by scrubbing with the scrubbing brush or the cleaning brush.

This cleaning work is not light, and, hence, reducing the frequency of the cleaning work is desired. Further, in recent years, environmental pollution by surfactant-containing wastewater has been pointed out. Therefore, reducing the amount of the surfactant used and the frequency of use of the surfactant is desired.

Under these circumstances, several proposals have been made on sanitary wares having a surface that is highly hygienic and has good appearance.

For example, coating of a fluororesin or a siloxane resin containing fluoroalkyl groups onto the surface of sanitary ware has been proposed to lower the surface energy, thereby permitting stains or soils to be less likely to be deposited onto the surface.

Another proposal is such that the surface of sanitary ware is made smooth as much as possible to prevent stains or soils from being deposited and strongly adhered onto the surface thereof. In this proposal, however, the relationship of the surface state to the inhibition of deposition of stains or soils, fastness, and glossiness has not been fully studied. Specifically, the sanitary ware having a smooth surface has been proposed based on such mere conceptual understanding that a smooth surface would inhibit the deposition of stains or soils thereon and would be preferred from the viewpoint of aesthetic effect.

Further, in connection with the antimicrobial activity of the surface of the sanitary ware, the following techniques have been proposed for improving the glaze layer as the surface layer.

Japanese Patent Laid-Open No. 236846/1998 discloses a pottery or ceramic whiteware product which has been prepared by applying, before firing, a transparent glaze with an inorganic antimicrobial agent incorporated therein onto a conventional color glaze and then firing the color glaze and the transparent glaze.

WO 96/23412 discloses a base glaze for a glaze layer to be provided on the surface of an antimicrobial member. The base glaze for the glaze layer is prepared by mixing water, a material for a glaze, and a pigment together, grinding the mixture to prepare a base glaze, mixing the base glaze with a heat-resistant powder bearing an antimicrobial metal, and then mixing the mixture with a binder.

SUMMARY OF THE INVENTION

It is an object of the present invention to provide a sanitary ware which permits stains or soils deposited on the surface thereof to be simply removed, for example, by running water.

The above object can be attained by the following invention. Specifically, according to the first embodiment of the present invention, there is provided a sanitary ware comprising at least a sanitary ware body and a glaze layer as an outermost layer of the sanitary ware, a monovalent metal component and/or a metal component having a measure of the electronegativity based on Pouling's rule of not more than 1 (hereinafter referred to as a "cleaning metal component") being provided so as to be releasable evenly and continuously, over the whole surface of the glaze layer as the outermost layer, in such an amount large enough to impart a self-cleaning function for releasing stains or soils to the surface of the glaze layer as the outermost layer, the metal component being suppliable from the glaze layer as the outermost layer and/or the sanitary ware body to the whole surface of the glaze layer as the outermost layer.

According to the second embodiment of the present invention, there is provided a sanitary ware wherein, in the sanitary ware according to the first embodiment of the present invention, the glaze layer as the outermost layer is a transparent glaze layer and the sanitary ware further comprises a colored glaze layer as an intermediate layer provided between the sanitary ware body and the glaze layer as the outermost layer.

According to the third embodiment of the present invention, there is provided a sanitary ware wherein the sanitary ware according to the first embodiment of the present invention further comprises a metal component layer which comprises the metal component as a main component, provided between the sanitary ware body and the glaze layer as the outermost layer, the metal component being suppliable from the metal component layer over the whole surface of the glaze layer as the outermost layer.

According to the fourth embodiment of the present invention, there is provided a sanitary ware wherein, in the sanitary ware according to the first embodiment of the present invention, the glaze layer as the outermost layer is a transparent glaze layer and the sanitary ware further comprises, provided between the sanitary ware body and the glaze layer as the outermost layer, a colored glaze layer as an intermediate layer provided on the sanitary ware body side and a metal component layer which comprises the metal component as a main component, provided on the side of the glaze layer as the outermost layer, the metal component being suppliable from the metal component layer over the whole surface of the glaze layer as the outermost layer.

According to the fifth embodiment of the present invention, there is provided a sanitary ware wherein, in the sanitary ware according to the first embodiment of the present invention, the glaze layer as the outermost layer is a transparent glaze layer and the sanitary ware further comprises, provided between the sanitary ware body and the glaze layer as the outermost layer, a metal component layer which comprises the metal component as a main component, provided on the sanitary ware body side and a colored glaze layer as an intermediate layer provided on the side of the glaze layer as the outermost layer, the metal component being suppliable from the metal component layer over the whole surface of the glaze layer as the outermost layer.

DETAILED DESCRIPTION OF THE INVENTION

Definition

Figure 1:
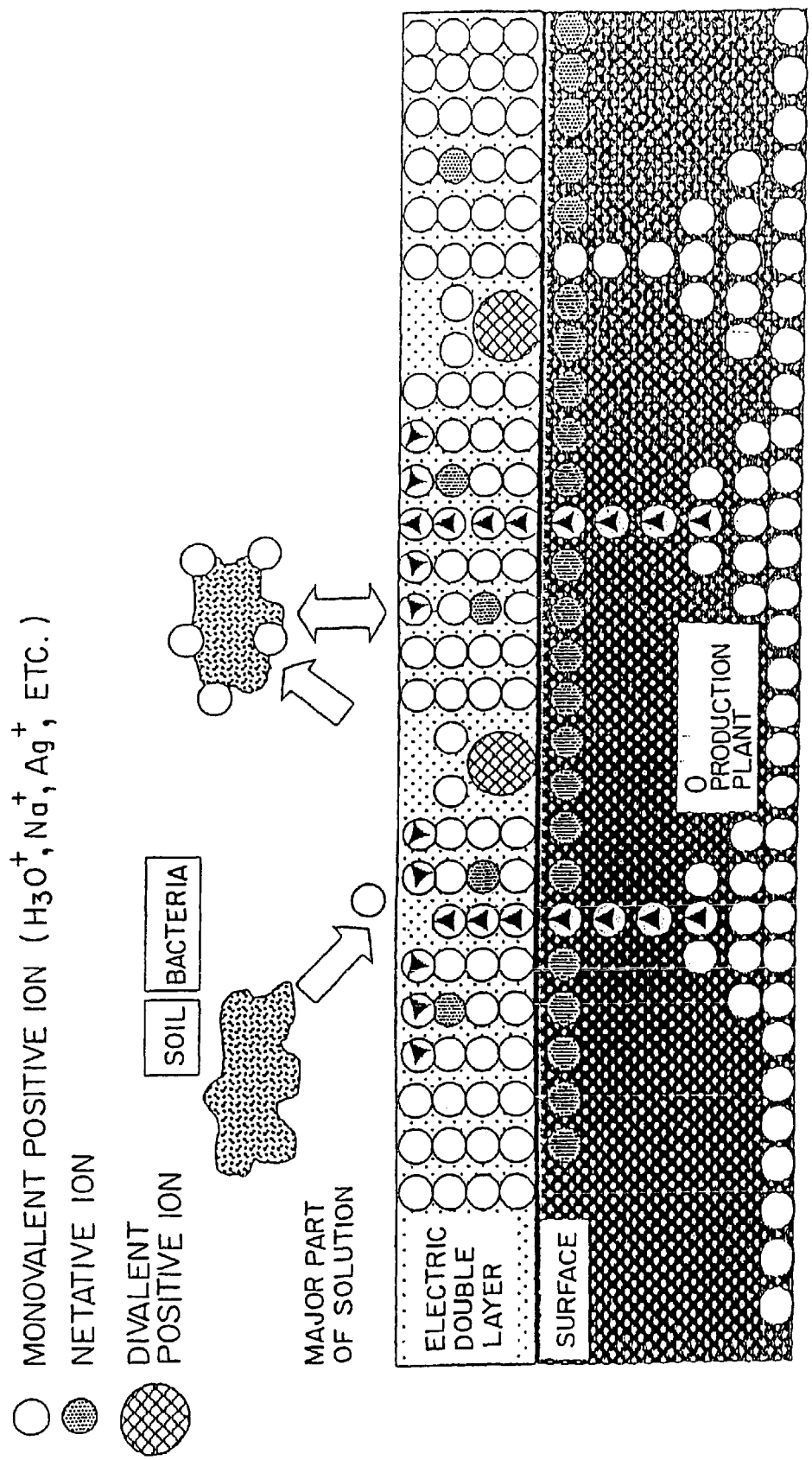
FIG. 1 is a schematic diagram showing the distribution of a cleaning metal component on the surface of the outermost layer of a sanitary ware.

The term "sanitary ware" used herein refers to earthenware products used in or around lavatories and washrooms, and specific examples thereof include toilets, urinals, strainers for urinals, flush tanks for toilets or urinals, washbowls in washstands, and wash hand basins.

The term "earthenware" used herein refers to a ceramic ware, the body of which has been densified to such an extent that the body has slight water absorption, the ceramic ware having a glazed surface.

Sanitary Ware having Self-cleaning Function

The sanitary ware according to the present invention has a self-cleaning function for releasing stains or soils. The "self-cleaning function" refers to such a property that stains or soils on a sanitary ware can be simply removed, for example, by running water without use of any surfactant and without strongly scrubbing the surface of the sanitary ware by a scrubbing brush or a cleaning brush.

The sanitary ware according to the present invention comprises at least a sanitary ware body and a glaze layer as an outermost layer of the sanitary ware. According to the present invention, a cleaning metal component is provided so as to be releasable evenly and continuously, over the whole surface of the glaze layer as the outermost layer, in such an amount large enough to impart a self-cleaning function for releasing stains or soils to the surface of the glaze layer as the outermost layer. The cleaning metal component is supplied from the glaze layer as the outermost layer and/or the sanitary ware body to the whole surface of the glaze layer as the outermost layer.

According to the present invention, the cleaning metal component refers to a monovalent metal component and/or a metal component having a measure of the electronegativity based on Pouling's rule of not more than 1. The metal component functions as a detergent (a builder) which does not lose its function upon firing. Specifically, the function is not lost even after firing of the sanitary ware, that is, after heat treatment at a temperature of 1100 to 1300° C.

Suitable monovalent metal components usable herein include lithium, sodium, potassium, rubidium, cesium, silver, copper, and gold. Suitable metal components having a measure of the electronegativity based on Pouling's rule of not more than 1 usable herein include lithium, sodium, potassium, rubidium, cesium, barium, and strontium. Among the monovalent metal components, silver and copper are preferred because they further have antimicrobial activity. The content of the cleaning metal component may be measured by X-ray photoelectron spectroscopy.

According to the present invention, the glaze layer as the outermost layer consists essentially of an amorphous component. It is considered that, since the amorphous structure is isotropic, the cleaning metal component can be relatively evenly moved in the network structure. As a result, the cleaning metal component contained in the glaze layer as the outermost layer and/or the sanitary ware body is movable to and continuously releasable to the surface of the outermost layer. Further, according to the present invention, the cleaning metal component is released evenly and continuously over the whole surface of the glaze layer as the outermost layer.

In the conventional sanitary ware, since the glaze contains opacifier particles, such as zircon particles, and pigment particles, these particles become exposed to the outermost surface during firing, and the exposed particles inhibit the release of the cleaning metal component onto the outermost surface. The portions, where the particles are exposed to the outermost surface, do not exhibit the cleaning function. Specifically, since a part of the opacifier particles is exposed on the surface, the cleaning metal component having the effect of removing greasy stains and soils is not supplied to these portions. Therefore, even though the cleaning metal component is present on the outermost surface, greasy stains or soils are deposited with the opacifier particles serving as the starting point. This makes it impossible to satisfactorily remove the stains or soils deposited on the surface of the sanitary ware by running water alone.

According to the present invention, the inhibiting particles have been excluded to realize even and continuous release of the cleaning metal component over the whole surface of the outermost layer of the sanitary ware. FIG. 1 is a schematic diagram showing the distribution of a cleaning metal component on the surface of the glaze layer as the outermost layer of a sanitary ware. As can be seen from FIG. 1, the cleaning metal component is evenly present over the whole surface of the glaze layer as the outermost layer. This imparts significantly improved greasy stain and soil deposition preventive properties to the whole surface of the outermost layer, that is, leads to excellent self-cleaning function.

Figure 2:
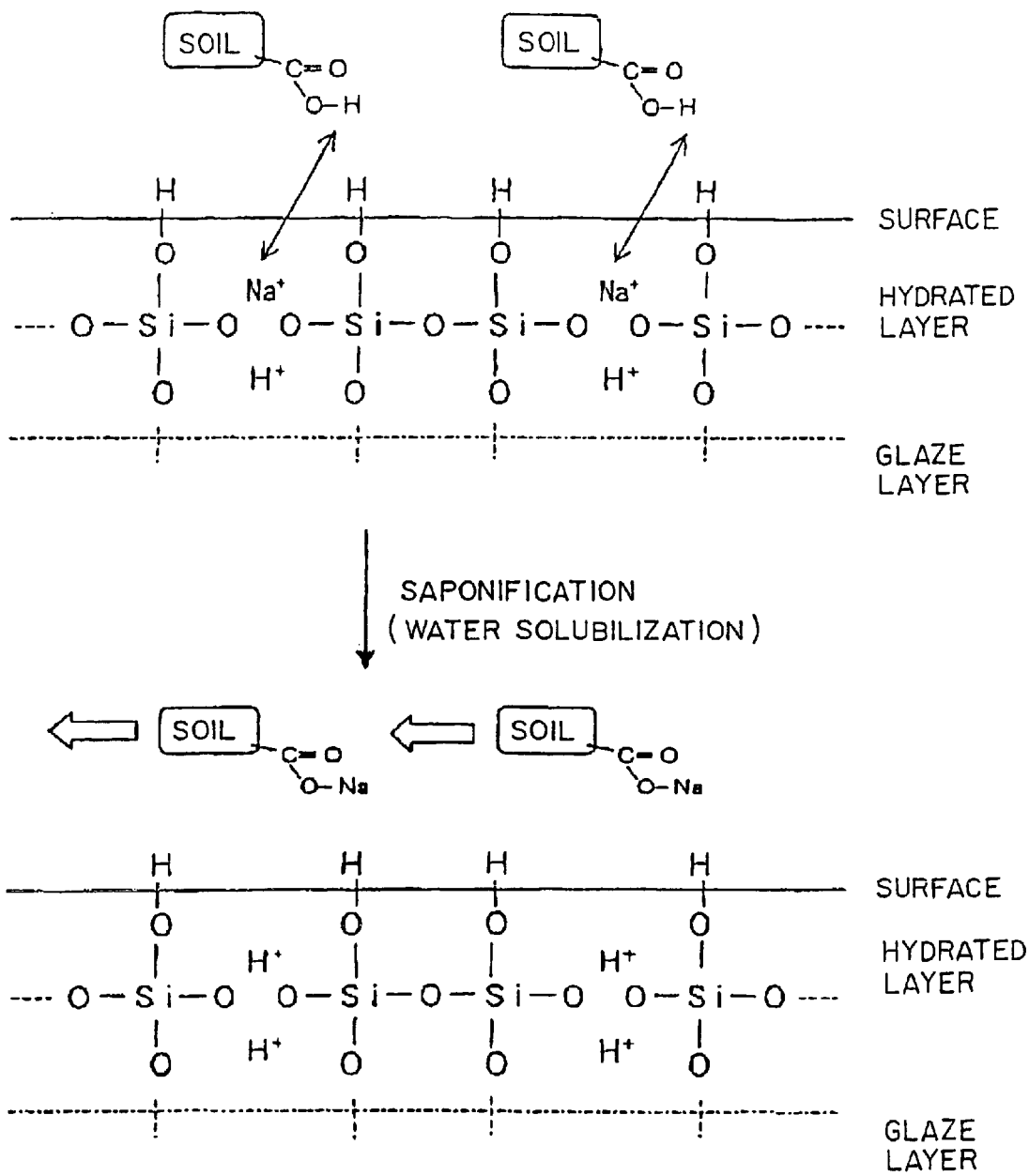
FIG. 2 is a diagram showing the adsorption or addition of a cleaning metal component onto molecules constituting a stain or soil by a substitution reaction to render the stain or soil soluble in water.

FIG. 2 illustrates the adsorption or addition of a cleaning metal component onto molecules constituting a stain or soil by a substitution reaction to render the stain or soil soluble in water. Stains or soils deposited on the surface of the sanitary ware include, for example, stool (containing a large amount of oleic acid and bacteria), miroorganisms, such as bacteria and fungi, and water scale in the case of toilet bowls; water scale, urinary calculi, and bacteria in the case of urinals; and metal soaps (scum of soaps), fatty acids, fatty esters, proteins, amino acids, and water scale in the case of washbowls. Major deposited stains and soils are carboxyl-terminated greasy stains or soils and water scale.

As shown in FIG. 2, upon the deposition of the carboxyl-terminated greasy stain or soil on the surface of the sanitary ware, when a cleaning metal component ($Na^+$ in FIG. 2) is present, the cleaning metal component is preferentially added or adsorbed to the greasy stain or soil by a substitution reaction. This improves the affinity of the surface of the sanitary ware for water, and, when the molecular weight of the stain or soil is low, the stain or soil is rendered soluble in water (saponified). As a result, the affinity of the stain or soil for water becomes higher than that for the surface of the sanitary ware, permitting the stain or soil to be easily removed by flushing the sanitary ware. Further, in this case, the re-adsorption of the stain or soil, which has been once left from the surface of the sanitary ware, can be prevented. This advantageous phenomenon is led from the function of the monovalent metal component and/or the metal component having a measure of the electronegativity based on Pouling's rule of not more than 1 as a builder (Yoshiro Abe, "Senzai Tsuron," KINDAI HENSHUSHA, 22–23 (1985)).

The source of supplying the cleaning metal component to the surface of the glaze layer as the outermost layer may be any of the glaze layer as the outermost layer, the sanitary ware body, and the glaze layer as an intermediate layer (when a glaze layer as an intermediate layer is provided between the glaze layer as the outermost layer and the sanitary ware body). Alternatively, a layer composed mainly of the cleaning metal component may be separately provided as a metal component layer. By virtue of this construction, the surface cleaning properties can be exhibited for a long period of time, and the self-cleaning function is semi-permanently ensured.

According to a preferred embodiment of the present invention, this surface state can be realized by preventing particles, which inhibit the release of the cleaning metal component onto the outermost surface, for example particles of opacifiers, such as $ZrO_2$, and pigments, from being substantially present on the surface of the glaze layer as the outermost layer. Preferably, this is done, for example, by any of the following methods.

(1) Exclusion of inhibiting particles: A transparent glaze is provided which contains a cleaning metal component and, at the same time, is free from pigment and opacifier particles as inhibiting particles. This transparent glaze is coated as an outermost layer onto a sanitary ware, and the coating is fired. Alternatively, a frit glaze, which is free from the interfering particles and contains a cleaning metal component, may be provided and then coated as a glaze layer as an outermost layer onto the sanitary ware, followed by firing.

(2) Grinding of inhibiting particles: A frit glaze containing a cleaning metal component or alternatively a colored glaze containing a cleaning metal component-containing salt is provided. This glaze is then ground until the inhibiting particles are finely divided. This ground colored glaze is then coated as a glaze layer as an outermost layer onto a sanitary ware, followed by firing. The extent of the size reduction of the inhibiting particles is preferably such that the average particle diameter as measured with a laser diffraction device is brought to not more than 6 $\mu$m.

According to a preferred embodiment of the present invention, the surface roughness Ra of the glaze layer as the outermost layer is less than 0.07 $\mu$m, preferably not more than 0.05 $\mu$m, more preferably not more than 0.03 $\mu$m, as measured with a stylus type surface roughness tester according to JIS B 0651. This makes it difficult for stains or soils to be deposited on concave and convex portions of the surface. This significantly improves the self-cleaning function for releasing deposited stains or soils.

The term "surface roughness Ra" used herein means the value obtained by the following formula when sampling only the reference length 1 from the roughness curve in the direction of mean line, taking X-axis in the direction of mean line and Y-axis in the direction of longitudinal magnification of this sampled part and the roughness curve is expressed by Y=f(x):

$$R_a = \frac{1}{l} \int_0^l |f(x)| dx$$

In the present invention, the surface roughness Ra is in accordance with the definition and designation specified in JIS B 0601(1994) and measured with a stylus type surface roughness tester according to JIS B 0651(1996). These JIS, together with English translation thereof, are easily available from Japanese Standards Association (1–24, Akasaka 4-chome, Minato-ku, Tokyo, Japan).

According to a preferred embodiment of the present invention, the glaze layer as the outermost layer consists essentially of an amorphous component (preferably a glass component). It is considered that, since this reduces the mobility of the detergent component in the glaze layer, the long-term retention of the self-cleaning function for releasing deposited stains or soils can be improved.

Figure 3:
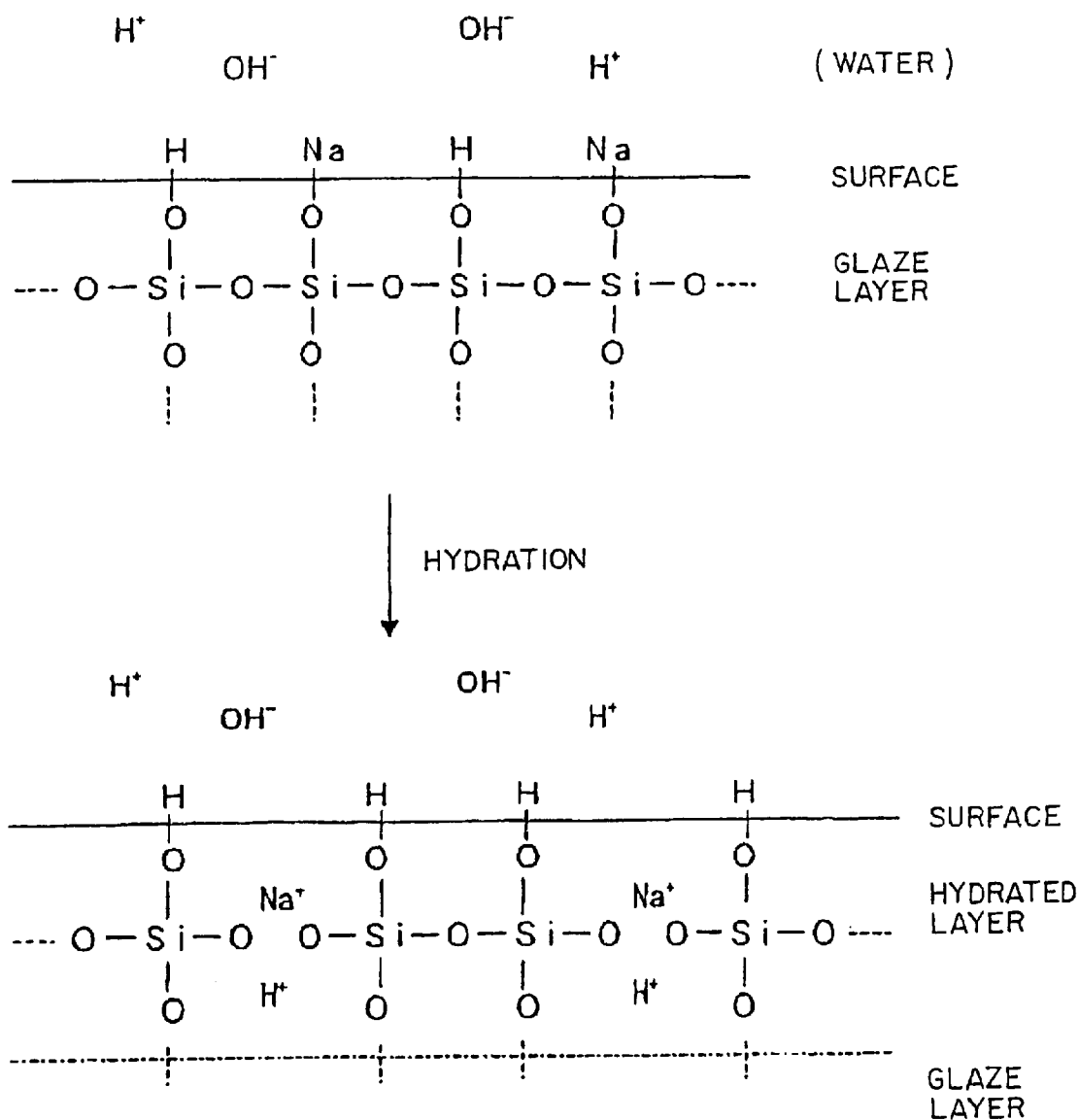
FIG. 3 is a diagram illustrating the formation of a hydrated layer on the surface of a sanitary ware.

According to a preferred embodiment of the present invention, the glaze layer as the outermost layer consists essentially of a hydratable material. Hydratable materials usable herein include materials which include an $SiO_4$ network structure having non-crosslinked oxygen through which water molecules can pass (for example, silica and silicate). FIG. 3 is a diagram illustrating the formation of a hydrated layer on the surface of the sanitary ware. As can be seen from FIGS. 2 and 3, the saponified stain or soil becomes considerably freely movable on the hydratable material as an electrolyte. Therefore, in the sanitary ware in its surface which has been inclined in the gravitational direction, the greasy stain or soil is moved in the gravitational direction without relying upon flushing, permitting the stain or soil to be more automatically removed.

According to a preferred embodiment of the present invention, the glaze layer as the outermost layer further contains an antimicrobial metal. This can prevent sanitary wares, such as toilets or urinals and washbowls, from being soiled due to the propagation of bacteria or eumycetes when the sanitary wares are left unused for a long period of time. According to a more preferred embodiment of the present invention, the antimicrobial metal is silver and/or copper. The content of the antimicrobial metal in the glaze layer as the outermost layer is not less than 0.1% by weight, more preferably not less than 0.5% by weight, in terms of oxide based on the whole metal component in the glaze layer as the outermost layer. This can more effectively prevent sanitary wares, such as toilets or urinals and washbowls, from being soiled due to the propagation of bacteria or eumycetes when the sanitary wares are left unused for a long period of time. Silver advantageously has high antimicrobial activity against bacteria, such as *Pseudomonas aeruginosa, Eschericia coli*, black yeast (black mold), and red yeast (pink slime). On the other hand, copper advantageously has high antimicrobial activity against eumycetes, such as mold.

According to a preferred embodiment of the present invention, the zeta potential of the surface of the glaze layer as the outermost layer at a pH value of about 7 is negative and has an absolute value of not less than 60 mV. This can increase the electrical repulsion of bacteria or eumycetes, present on the surface of the glaze layer as the outermost layer, against bacteria or eumycetes which are negatively charged in water generally having a pH value of about 7, thereby more effectively preventing the deposition of bacterial or eumycetes. Therefore, the self-cleaning function according to the present invention can be further improved.

The thickness of the glaze layer as the outermost layer is generally 0.05 to 1.2 mm, preferably 0.1 to 0.8 mm, more preferably 0.15 to 0.4 mm. When the glaze layer as the intermediate layer is provided, the thickness thereof is generally 0.05 to 1.8 mm, preferably 0.1 to 1.2 mm, more preferably 0.2 to 0.7 mm.

Thus, according to the sanitary ware of the present invention, there are various embodiments on layer constructions and surface formation methods for imparting a self-cleaning function to the surface of the sanitary ware. Five preferred embodiments associated with this will be explained.

Sanitary Ware according to First Embodiment

Figure 4:
FIG. 4 is a diagram showing the layer construction of the sanitary ware according to the first embodiment of the present invention, wherein numeral 1 designates a sanitary ware body and numeral 2 a glaze layer as an outermost layer (the designating of the numerals 1 and 2 in FIG. 4 being applied to FIGS. 5 to 8)

FIG. 4 shows the layer construction of the sanitary ware according to the first embodiment of the invention. As can be seen from FIG. 4, the sanitary ware according to the first embodiment of the present invention comprises at least a sanitary ware body 1 and a glaze layer 2 as an outermost layer of the sanitary ware.

In this embodiment, at least one of the sanitary ware body 1 and the glaze layer 2 as the outermost layer is constructed so that a cleaning metal component is suppliable over the whole surface of the glaze layer 2 as the outermost layer and, in this case, is releasable evenly and continuously over the whole surface of the glaze layer 2 as the outermost layer. By virtue of the above mechanism, the surface of the sanitary ware can retain the self-cleaning function for releasing deposited stains or soils for a long period of time.

According to a preferred embodiment of the present invention, the cleaning metal component is contained in at least the sanitary ware body 1. In this preferred embodiment, the cleaning metal component can pass through the glaze layer 2 as the outermost layer composed mainly of a vitreous material and then can function to release stains or soils. Therefore, the sustained release effect can be improved, contributing to the retention of the self-cleaning function for releasing deposited stains or soils for a longer period of time. Further, in this case, the sanitary ware in its non-glazed surface also can exhibit the self-cleaning function for releasing deposited stains or soils.

According to a more preferred embodiment of the present invention, the cleaning metal component is contained in the glaze layer 2 as the outermost layer. This can improve also the self-cleaning function for releasing deposited stains or soils at an early stage in the use of the sanitary ware. The cleaning metal component may be contained in both the sanitary ware body 1 and the glaze layer 2 as the outermost layer.

According to a preferred embodiment of the present invention, the content of the cleaning metal component in the glaze layer 2 as the outermost layer is not less than 7% by weight in terms of oxide based on the whole metal component in the glaze layer 2 as the outermost layer. This can significantly improve the self-cleaning function for releasing deposited stains or soils.

According to a preferred embodiment of the present invention, the content of the cleaning metal component in the glaze layer 2 as the outermost layer is less than 20% by weight, more preferably not more than 15% by weight, in terms of oxide based on the whole metal component in the glaze layer 2 as the outermost layer. In this case, while satisfactorily exhibiting the self-cleaning function for releasing deposited stains or soil, it is possible to reduce product defects caused by such a phenomenon that a gas evolved within the sanitary ware body 1 by a chemical reaction or the like of clay at the time of raising the temperature stays as bubbles within the glaze without release into the outside of the sanitary ware body upon shrinkage at the time of firing. Further, cracking due to an increase in a difference in coefficient of thermal expansion, between the glaze layer 2 as the outermost layer and the sanitary ware body 1, created by an excessive increase in the coefficient of thermal expansion of the glaze layer 2 as the outermost layer can also be prevented.

According to another preferred embodiment of the present invention, an engobe layer may be provided on the surface of the sanitary ware body 1 to prevent a gas evolved within the sanitary ware body 1 from entering the glaze.

According to a preferred embodiment of the present invention, the content of the cleaning metal component in the sanitary ware body 1 is not less than 5% by weight in terms of oxide based on the whole metal component in the sanitary ware body 1. This can improve the retention of the self-cleaning function for releasing deposited stains or soils for a long period of time.

The sanitary ware according to the first embodiment of the present invention may be produced by any production process without particular limitation. For example, the following production processes (1) to (4) may be mentioned.

(1) One process for producing the sanitary ware according to the first embodiment comprises, for example, providing a frit glaze containing not less than 7% by weight, in terms of oxide, of a cleaning metal component, optionally grinding the frit glaze, coating the resultant glaze onto a sanitary ware body, and then firing the coating at a temperature of 1100 to 1300° C.

(2) Another process for producing the sanitary ware according to the first embodiment comprises, for example, providing a glaze prepared by adding not less than 7% by weight, in terms of oxide based on the whole metal component of the glaze, of a salt containing a cleaning metal component to a conventional colored glaze material, grinding the glaze until the inhibiting particles are satisfactorily size reduced, coating the ground glaze onto a sanitary ware body, and firing the coating at a temperature of 1100 to 1300° C.

(3) Still another process for producing the sanitary ware according to the first embodiment comprises, for example, providing a glaze composed of a mixture containing a frit, the inhibiting particles and other components, grinding the glaze until the inhibiting particles are satisfactorily size reduced, coating the ground glaze onto a sanitary ware body, and firing the coating at a temperature of 1100 to 1300° C.

(4) A further process for producing the sanitary ware according to the first embodiment comprises, for example, impregnating a cleaning metal component-containing salt into the surface of a sanitary ware body, glazing the sanitary ware body, and then conducting firing at a temperature of 1100 to 1300° C.

Sanitary Ware according to Second Embodiment

Figure 5:
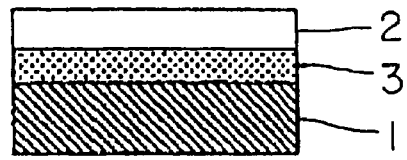
FIG. 5 is a diagram showing the layer construction of the sanitary ware according to the second embodiment of the present invention, wherein numeral 3 designates a glaze layer as an intermediate layer (the designating of the numeral 3 in FIG. 5 being applied to FIGS. 6 to 8)

FIG. 5 shows the layer construction of the sanitary ware according to the second embodiment of the present invention. As can be seen from FIG. 5, the sanitary ware according to the second embodiment of the present invention comprises a sanitary ware body 1, a colored glaze layer 3 as an intermediate layer provided on the surface of the sanitary ware body 1, and a transparent glaze layer 2 as an outermost layer of the sanitary ware.

In this embodiment, at least one of the sanitary ware body 1, the glaze layer 2 as the outermost layer, and the glaze layer 3 as the intermediate layer is constructed so that a cleaning metal component is suppliable over the whole surface of the glaze layer 2 as the outermost layer and, in this case, is releasable evenly and continuously over the whole surface of the glaze layer 2 as the outermost layer. By virtue of the above mechanism, the surface of the sanitary ware can retain the self-cleaning function for releasing deposited stains or soils for a long period of time.

In particular, according to the second embodiment, the glaze layer 2 as the outermost layer of the sanitary ware is a transparent glaze layer free from the inhibiting particles, such as pigment and opacifier particles. Therefore, the cleaning metal component can be released evenly and continuously over the whole surface of the glaze layer 2 as the outermost layer, the sustained release effect of the cleaning metal component can be improved, and the self-cleaning function according to the present invention can be retained for a long period of time. Further, the components of the glaze layer 2 as the outermost layer can be selected independently of the compatibility with the sanitary ware body in terms of the coefficient of thermal expansion or the like. Therefore, a larger amount of the cleaning metal component can be incorporated into the glaze layer 2 as the outermost layer, and, thus, the self-cleaning function at an early stage in the use of the sanitary ware can also be improved.

According to a preferred embodiment of the present invention, the cleaning metal component is contained in at least the glaze layer 2 as the outermost layer. The components of the glaze layer 2 as the outermost layer can be selected independently of the compatibility with the sanitary ware body 1 in terms of the coefficient of thermal expansion. Therefore, a larger amount of the cleaning metal component can be incorporated into the glaze layer 2 as the outermost layer, and, thus, the self-cleaning function for releasing deposited stains or soils at an early stage in the use of the sanitary ware can also be improved.

According to a preferred embodiment of the present invention, the cleaning metal component is contained in at least one of the sanitary ware body 1 and the glaze layer 3 as the intermediate layer. In this preferred embodiment, the cleaning metal component can pass through the glaze layer 2 as the outermost layer composed mainly of a vitreous material and then can function to release stains or soils. Therefore, the sustained release effect can be improved, contributing to the retention of the self-cleaning function for releasing deposited stains or soils for a longer period of time.

According to a preferred embodiment of the present invention, the content of the cleaning metal component in the glaze layer 2 as the outermost layer is not less than 7% by weight in terms of oxide based on the whole metal component in the glaze layer 2 as the outermost layer. This can significantly improve the self-cleaning function for releasing deposited stains or soils.

According to a preferred embodiment of the present invention, the content of the cleaning metal component in the glaze layer 2 as the outermost layer is less than 30% by weight, more preferably not more than 20% by weight, still more preferably not more than 15% by weight, in terms of oxide based on the whole metal component in the glaze layer 2 as the outermost layer. In this case, while satisfactorily exhibiting the self-cleaning function for releasing-deposited stains or soil, it is possible to reduce product defects caused by such a phenomenon that a gas evolved within the sanitary ware body 1 in a chemical reaction or the like of clay at the time of raising the temperature stays as bubbles within the glaze without release into the outside of the sanitary ware body upon shrinkage at the time of firing.

According to a preferred embodiment of the present invention, the content of the cleaning metal component in the sanitary ware body 1 is not less than 5% by weight in terms of oxide based on the whole metal component in the sanitary ware body 1. This can improve the retention of the self-cleaning function for releasing deposited stains or soils for a long period of time.

The sanitary ware according to the second embodiment may be produced by any production process without particular limitation. For example, the sanitary ware according to the second embodiment may be produced by coating a conventional colored glaze onto a sanitary ware body, further coating a (frit) glaze containing a cleaning metal component in an amount of not less than 7% by weight in terms of oxide and free from a pigment and an opacifier onto the colored glaze coating and then conducting firing at a temperature of 1100 to 1300° C.

Sanitary Ware according to Third Embodiment

Figure 6:
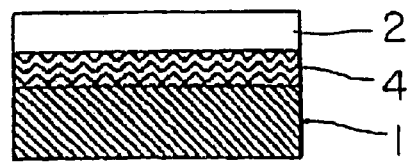
FIG. 6 is a diagram showing the layer construction of the sanitary ware according to the third embodiment of the present invention, wherein numeral 4 designates a metal component layer (the designating of the numeral 4 in FIG. 6 being applied to FIGS. 7 and 8)

FIG. 6 shows the layer construction of the sanitary ware according to the third embodiment of the present invention. As can be seen from FIG. 6, the sanitary ware according to the third embodiment of the present invention comprises a sanitary ware body 1, a metal component layer 4, composed mainly of a cleaning metal component, provided on the surface of the sanitary ware body, and a glaze layer 2 as an outermost layer of the sanitary ware provided on the surface of the metal component layer.

In this embodiment, the cleaning metal component is suppliable, mainly by the metal component layer 4, to the whole surface of the glaze layer 2 as the outermost layer and, in this case, is releasable evenly and continuously over the whole surface of the glaze layer 2 as the outermost layer. By virtue of the above mechanism, the surface of the sanitary ware can retain the self-cleaning function for releasing deposited stains or soils for a long period of time.

In particular, the sanitary ware according to the third embodiment has the sanitary ware body 1 and the glaze layer 2 as the outermost layer as used in the sanitary ware according to the first embodiment of the present invention. Further, a metal component layer 4 as a source for the cleaning metal component is provided between the sanitary ware body 1 and the glaze layer 2 as the outermost layer. This can further increase the amount of the cleaning metal component stored in the sanitary ware, and, at the same time, can improve the sustained release effect of the cleaning metal component. Therefore, the surface of the sanitary ware can exhibit the self-cleaning function for releasing deposited stains or soils for a longer period of time. The cleaning metal component may be contained in both the sanitary ware body 1 and/or the glaze layer 2 as the outermost layer.

The metal component layer 4 is a layer composed mainly of a cleaning metal component. Preferably, the cleaning metal component consists essentially of a compound composed mainly of the cleaning metal component. Preferred cleaning metal component-containing compounds usable herein include sodium carbonate, potassium carbonate, lithium carbonate, cesium carbonate, rubidium carbonate, barium carbonate, strontium carbonate, silver carbonate, copper(I) carbonate, sodium silicate, potassium silicate, lithium silicate, cesium silicate, rubidium silicate, barium silicate, strontium silicate, silver silicate, copper(I) silicate, sodium chloride, potassium chloride, lithium chloride, cesium chloride, rubidium chloride, barium chloride, strontium chloride, silver chloride, copper(I) chloride, sodium acetate, potassium acetate, lithium acetate, cesium acetate, rubidium acetate, barium acetate, strontium acetate, silver acetate, copper(I) acetate, sodium sulfate, potassium sulfate, lithium sulfate, cesium sulfate, rubidium sulfate, barium sulfate, strontium sulfate, silver sulfate, copper(I) sulfate, sodium nitrate, potassium nitrate, lithium nitrate, cesium nitrate, rubidium nitrate, barium nitrate, strontium nitrate, silver nitrate, copper(I) nitrate, sodium lactate, potassium lactate, lithium lactate, cesium lactate, barium lactate, rubidium lactate, strontium lactate, silver lactate, copper(I) lactate, sodium borate, potassium borate, lithium borate, cesium borate, rubidium borate, barium borate, strontium borate, sodium propionate, potassium propionate, lithium propionate, cesium propionate, rubidium propionate, barium propionate, strontium propionate, silver propionate, copper (I) propionate, sodium butyrate, potassium butyrate, lithium butyrate, cesium butyrate, rubidium butyrate, barium butyrate, strontium butyrate, silver butyrate, copper(I) butyrate, sodium formate, potassium formate, lithium formate, cesium formate, rubidium formate, barium formate, strontium formate, silver formate, copper(I) formate, gold(I) chloride, liquid bright gold, gold powder, silver powder, water glass, $H(AuCl_4) \cdot 4H_2O$, and $Na(AuCl_4) \cdot 2H_2O$.

The sanitary ware according to the third embodiment of the present invention may be produced by any production process without particular limitation. For example, the following production processes (1) and (2) may be mentioned.

(1) One process for producing the sanitary ware according to the third embodiment comprises first coating a material with a cleaning metal component being incorporated therein by firing, such as water glass, onto a sanitary ware body to form a metal component layer, providing a colored glaze, grinding the colored glaze until interfering particles are satisfactorily size reduced, coating the ground colored glaze onto the metal component layer, and then conducting firing at a temperature of 1100 to 1300° C.

(2) Another process for producing the sanitary ware according to the third embodiment comprises first coating a cleaning metal component-containing material, such as water glass, onto a sanitary ware body to form a metal component layer, providing a frit glaze of a cleaning metal component, optionally grinding the frit glaze, coating the frit glaze onto the metal component layer, and then conducting firing at a temperature of 1100 to 1300° C.

Sanitary Ware according to Fourth Embodiment

Figure 7:
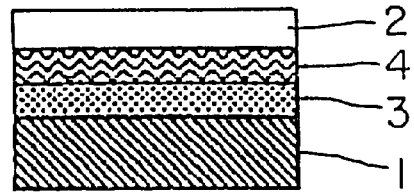
FIG. 7 is a diagram showing the layer construction of the sanitary ware according to the fourth embodiment of the present invention.

FIG. 7 shows the layer construction of the sanitary ware according to the fourth embodiment of the present invention. As can be seen from FIG. 7, the sanitary ware according to the fourth embodiment of the present invention comprises at least a sanitary ware body 1, a colored glaze layer 3 as an intermediate layer provided on the surface of the sanitary ware body 1, a metal component layer 4, composed mainly of a cleaning metal component, provided on the surface of the glaze layer as the intermediate layer, and a transparent glaze layer 2 as an outermost layer of the sanitary ware provided on the surface of the metal component layer.

In the fourth embodiment, the cleaning metal component is suppliable, mainly by the metal component layer 4, to the whole surface of the glaze layer 2 as the outermost layer and, in this case, is releasable evenly and continuously over the whole surface of the glaze layer 2 as the outermost layer. By virtue of the above mechanism, the surface of the sanitary ware can retain the self-cleaning function for releasing deposited stains or soils for a long period of time.

In particular, the sanitary ware according to the fourth embodiment has the sanitary ware body 1, the glaze layer 3 as the intermediate layer, the glaze layer 2 as the outermost layer as used in the sanitary ware according to the second embodiment of the present invention. The metal component layer 4 as used in the third embodiment is provided, as a source for the cleaning metal component, between the glaze layer 3 as the intermediate layer and the glaze layer 2 as the outermost layer. The glaze layer 2 as the outermost layer is a transparent glaze layer free from interfering particles, such as pigment and opacifier particles, and, in addition, the metal component layer 4 can function as a source for the cleaning metal component. Therefore, the cleaning metal component can be easily released evenly and continuously over the whole surface of the glaze layer 2 as the outermost layer, and the self-cleaning function according to the present invention can be satisfactorily exhibited and, at the same time, can be retained for a longer period of time.

The sanitary ware according to the fourth embodiment of the present invention may be produced by any production process without particular limitation. For example, the sanitary ware may be produced by a production process which comprises coating a conventional colored glaze on a sanitary ware body, coating a cleaning metal component-containing material, such as water glass, onto the glaze layer to form a metal component layer, and coating a glaze containing neither a pigment nor an opacifier, and then conducting firing at a temperature of 1100 to 1300° C.

Sanitary Ware according to Fifth Embodiment

Figure 8:
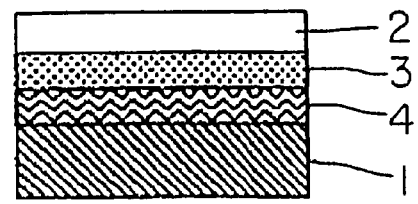
FIG. 8 is a diagram showing the layer construction of the sanitary ware according to the fifth embodiment of the present invention.

FIG. 8 shows the layer construction of the sanitary ware according to the fifth embodiment of the present invention. As can be seen from FIG. 8, the sanitary ware according to the fifth embodiment of the present invention comprises a sanitary ware body 1, a metal component layer 4, composed mainly of a cleaning metal component, provided on the surface of the sanitary ware body, a colored glaze layer 3 as an intermediate layer provided on the surface of the metal component layer, and a transparent glaze layer 2 as an outermost layer of the sanitary ware provided on the surface of the glaze layer as the intermediate layer.

In the fifth embodiment of the present invention, the cleaning metal component is suppliable, mainly by the metal component layer 4, to the whole surface of the glaze layer 2 as the outermost layer and, in this case, is releasable evenly and continuously over the whole surface of the glaze layer 2 as the outermost layer. By virtue of the above mechanism, the surface of the sanitary ware can retain the self-cleaning function for releasing deposited stains or soils for a long period of time.

In particular, the sanitary ware according to the fifth embodiment of the present invention has the sanitary ware body 1, the glaze layer 3 as the intermediate layer, the glaze layer 2 as the outermost layer as used in the sanitary ware according to the second embodiment of the present invention. The metal component layer 4 as used in the third embodiment is provided, as a source for the cleaning metal component, between the sanitary ware body 1 and the glaze layer 3 as the intermediate layer. The glaze layer 2 as the outermost layer is a transparent glaze layer free from interfering particles, such as pigment and opacifier particles, and, in addition, the metal component layer 4 can function as a source for the cleaning metal component. Therefore, the cleaning metal component can be released evenly and continuously over the whole surface of the glaze layer 2 as the outermost layer, and the self-cleaning function according to the present invention can be satisfactorily exhibited and, at the same time, can be retained for a longer period of time.

The sanitary ware according to the fifth embodiment of the present invention may be produced by any production process without particular limitation. For example, the sanitary ware may be produced by a production process which comprises coating a cleaning metal component-containing material, such as water glass, onto a sanitary ware body, coating a conventional colored glaze, coating a glaze containing neither a pigment nor an opacifier, onto the glaze layer, and then conducting firing at a temperature of 1100 to 1300° C.

Applications

The sanitary ware according to the present invention refers to earthenware products used in or around lavatories and washrooms, and can be applied to a wide variety of applications, such as toilets, urinals, strainers for urinals, flush tanks for toilets or urinals, washbowls in washstands, and wash hand basins.

According to a preferred embodiment of the present invention, the sanitary ware is a toilet or a urinal.

Main components of feces discharged from human beings are oleic acid and bacteria. Both the oleic acid and the bacteria are carboxyl terminal group-containing substances. Therefore, when the sanitary ware according to the present invention is applied to a toilet, feces are less likely to be deposited onto the bowl surface of the toilet because they are removed upon flushing of the bowl.

Upon the deposition of water scale onto the toilet, the scale deposited surface is changed from a hydrophilic state to a water-repellent state. As a result, upon flushing, water does not flow on the water-repellent surface, and this causes staining or soiling at an increasingly rapid pace. The application of the sanitary ware according to the present invention to the toilet can solve this problem and enables water to run over the whole surface of the toilet bowl. Therefore, it is possible to provide toilets wherein stains or soils are less likely to be deposited onto the toilet bowl.

When water scale accumulates on a toilet or a urinal to a certain thickness, the toilet or urinal is cracked. Microorganisms, such as mold, propagate in the cracked portion. It is considered that, as soon as the number of microorganisms exceeds a predetermined value, these microorganisms are seen as black soils. The application of the sanitary ware according to the present invention to the toilet or urinal can solve this problem and can prevent the formation of the water scale film. Therefore, it is possible to provide toilets or urinals wherein black soils are less likely to be deposited.

Upon the deposition of urinary calculi onto a toilet or a urinal, the deposited portion serves as a hotbed of the propagation of eumycetes or bacteria. When the number of eumycetes or bacteria exceeds a certain value, these eumycetes or bacteria are seen as yellow, pink, or brown soils. The application of the sanitary ware according to the present invention to the toilet or urinal can prevent urinary calculi, which serve as a hotbed of the propagation of eumycetes or bacteria, from being deposited on the toilet or urinal. Therefore, it is possible to provide toilets or urinals which are less likely to be soiled.

According to another preferred embodiment of the present invention, the sanitary ware is a washbowl.

Major components of soils or stains in the washbowl are lipids (fatty esters) derived form human beings and scum of soaps (calcium salts of fatty acids), both of which are carboxyl terminal group-containing substances. Therefore, when the sanitary ware according to the present invention is applied to the washbowl, these soils or stains are less likely to be deposited onto the washbowl because they are removed by flushing from the bowl surface.

EXAMPLES

The present invention will be described in more detail with reference to the following examples, though it is not limited to these examples only.

Composition of Glaze

A material A for a glaze used in the following examples and comparative examples has a composition shown in Table 1.

TABLE 1

| Material for glaze | wt % |
| --- | --- |
| $SiO_2$ | 55–80 |
| $Al_2O_3$ | 5–13 |
| $Fe_2O_3$ | 0.1–0.4 |
| MgO | 0.8–3.0 |
| CaO | 8–17 |
| ZnO | 3–8 |
| $K_2O$ | 1–4 |
| $Na_2O$ | 0.5–2.5 |
| $ZrO_2$ | 0.1–15 |
| Pigment | 1–20 |

Testing Methods

In the following examples and comparative examples, evaluation tests were carried out by the following methods.

Test 1: Surface Roughness of Glaze Layer as the Outermost Layer

The surface roughness Ra of the glaze layer was measured with a stylus type surface roughness tester (JIS B 0651).

Test 2: Zeta Potential of the Surface of the Glaze Layer

The zeta potential of the surface of the glaze layer was measured with a laser zeta electrometer (ELS-6000, manufactured by Otsuka Denshi K.K.). Specifically, the electroosmotic fluid flow was measured using an aqueous NaCl solution (pH 7.0, concentration 10 mM) as an electrolyte and a polystyrene latex as monitor particles for light scattering, and then analyzed by the Mori-Okamoto's equation.

Test 3: Antimicrobial Activity

The antimicrobial activity was evaluated by measuring the bactericidal activity against *E. coli* (*Eschericia coli*, IFO 3972).

A bacterial suspension (0.2 ml) (number of bacteria: 1×10⁵ to 5×10⁵) was dropped on the surface of the glaze layer in a sample which had been previously sterilized with 70 vol % ethanol and then dried. The glaze layer was then covered with a polyethylene film having a size of 45 mm×45 mm to intimately contact the bacterial suspension with the sample. The specimen thus obtained was then allowed to stand for 24 hr in an atmosphere having a temperature of 37±1° C. and a relative humidity of not less than 90%. Thereafter, the film was separated, and imprinting was carried out in an NA medium, followed by cultivation under an environment having a temperature of 35±1° C. for 16 to 20 hr. The vial cell count (hereinafter referred to as "vial cell count for the test sample") was then measured.

Separately, for a blank sample having no significant antimicrobial activity (control sample), in the same manner as described above, a specimen was prepared, and the vial cell count (hereinafter referred to as "vial cell count for the control sample") was then measured.

The sterilization and the growth inhibition were calculated based on the vial cell count for the test sample and the vial cell count for the control sample by the following equations to evaluate the antimicrobial activity.

Sterilization (%)=100×("vial cell count for control sample"−"vial cell count for test sample")/"vial cell count for control sample")

Growth inhibition=log("vial cell count for control sample"/"vial cell count for control sample")

Test 4: Resistance to Dummy Stain in Water

A dummy stain consisting of 200 parts by weight of oleic acid, 1 part by weight of an engine oil, and 1 part by weight of oil black was prepared. Oleic acid is a main component of feces. The engine oil and the oil black were used as additives for rendering the oil easily visible. Next, about 270 cc of distilled water was placed in a 300 cc beaker, and about 30 cc of the dummy stain was then added thereto. A plate specimen was immersed in the beaker, and the time, elapsed until the oil stain deposited on the surface of the glaze layer was separated in water, was measured.

Test 5: Resistance to Dummy Stain in Air

A dummy stain (0.3 cc) having the same composition as used in test 4 was dropped on the center of a horizontally placed plate specimen. The plate specimen was then stood vertically. Five min after the vertical standing of the sample, the sample was visually inspected for the residual dummy stain on the glaze surface.

Test 6: Visual Inspection of Glaze Layer in its Surface

The appearance of the glaze layer in its surface was visually evaluated.

Test 7: Analysis of Glaze Layer in its Surface

The surface of the glaze layer was analyzed by an electron probe microanalyzer (EPMA: JXA 8900 RL, manufactured by Japan Electric Optical Laboratory).

Example A1

The material A for a glaze (2 kg), 1 kg of water, and 4 kg of balls were placed in a ceramic pot having a volume of 6 liters, and the mixture was then ball milled for about 18 hr to obtain a glaze slurry as a glaze A. The particle diameter of the glaze A thus obtained was measured with a laser diffraction particle size distribution analyzer. As a result, it was found that 65% of the particles were accounted for by particles having a diameter of not more than 10 μm and the 50% average particle diameter (D50) was 5.8 μm.

Separately, a material for a glaze was provided which had the same composition as the material A for a glaze, except that $ZrO_2$ as the opacifier and the pigment were removed from the composition of the material A for a glaze. This material for a glaze was melted at 1300 to 1400° C. in an electric furnace, and the melt was then quenched in water to obtain a glass frit. The glass frit was then stamp milled to obtain a powder. The powder thus obtained (600 g), 3.0 g (0.5% by weight based on the glaze) of a silver powder, 400 g of water, and 1 kg of alumina balls were placed in a ceramic pot having a volume of 2 liters, and the mixture was then ball milled for about 24 hr. Thus, a glaze slurry as a glaze B was obtained. The particle diameter of the glaze B was measured with a laser diffraction particle size distribution analyzer. As a result, it was found that 68% of the particles were accounted for by particles having a diameter of not more than 10 μm and the 50% average particle diameter (D50) was 6.0 μm.

Next, a plate specimen having a size of 70×150 mm was prepared using a slurry for a sanitary ware body prepared using silica sand, feldspar, clay and the like as raw materials. The glaze A was spray coated onto the plate specimen to form a lower glaze layer, and the glaze B was then spray coated thereon to form an upper glaze layer, followed by firing at 1100 to 1200° C. to obtain a sample.

For the sample thus obtained, tests 1 to 3 described above were carried out. The results were as follows.

Test 1: The surface roughness of the glaze layer as the outermost layer was Ra=0.02 μm.

Test 2: The zeta potential of the glaze layer as the outermost layer in its surface was −68.3 mV.

Test 3: The sterilization was 99.994%, and the growth inhibition was 4.2. Based on these results, the sample was evaluated as having significant antimicrobial activity.

Example A2

A material for a glaze was provided which had the same composition as the material A for a glaze, except that the $ZrO_2$ as the opacifier and the pigment were removed from the composition of the material A for a glaze. This material for a glaze was melted at 1300 to 1400° C. in an electric furnace, and the melt was then quenched in water to obtain a glass frit. The glass frit was then stamp milled to obtain a powder. The powder thus obtained (600 g), 6.0 g (1.0% by weight based on the glaze) of a copper oxide powder, 400 g of water, and 1 kg of alumina balls were placed in a ceramic pot having a volume of 2 liters, and the mixture was then ball milled for about 24 hr. Thus, a glaze slurry as a glaze C was obtained. The particle diameter of the glaze C thus obtained was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze A was spray coated onto the same plate specimen as used in Example A1 to form a lower glaze layer, and the glaze C was then spray coated thereon to form an upper glaze layer, followed by firing at 1100 to 1200° C. to obtain a sample.

For the sample thus obtained, tests 1 to 3 described above were carried out. The results were as follows.

Test 1: The surface roughness of the glaze layer as the outermost layer was Ra=0.03 μm.

Test 2: The zeta potential of the glaze layer as the outermost layer in its surface was −60.2 mV.

Test 3: The sterilization was 99.0%, and the growth inhibition was 2.0. Based on these results, the sample was evaluated as having significant antimicrobial activity.

Example A3

The frit glaze slurry (free from the opacifier and the pigment, D50=6.0 μm) (80 parts by weight) prepared in Example A1 was mixed with 20 parts by weight of a glaze slurry (D50=5.9 μm), free from the opacifier and the pigment, before fritting. A silver powder was added in an amount of 0.5% by weight based on the solid content of the glaze to the mixed slurry, followed by stirring and mixing by means of a plunger. Thus, a glaze slurry as a glaze D was obtained. The particle diameter of the glaze D was measured with a laser diffraction particle size distribution analyzer. As a result, it was found that 57% of the particles were accounted for by particles having a diameter of not more than 10 μm and the 50% average particle diameter (D50) was 6.0 μm.

Next, the glaze A was spray coated onto the same plate specimen as used in Example A1 to form a lower glaze layer, and the glaze D was then spray coated thereon to form an upper glaze layer, followed by firing at 1100 to 1200° C. to obtain a sample.

For the sample, tests 1 to 3 described above were carried out. The results were as follows.

Test 1: The surface roughness of the glaze layer as the outermost layer was Ra=0.05 μm.

Test 2: The zeta potential of the glaze layer as the outermost layer in its surface was −61.3 mV.

Test 3: The sterilization was 99.991%, and the growth inhibition was 4.0. Based on these results, the sample was evaluated as having significant antimicrobial activity.

Example A4

The material A for a glaze (600 g), 3.0 g (0.5% by weight based on the glaze) of a silver powder, 400 g of water, and 1 kg of alumina balls were placed in a ceramic pot having a volume of 2 liters, and the mixture was then ball milled for about 65 hr. Thus, a glaze slurry as a glaze E was obtained. The particle diameter of the glaze E was measured with a laser diffraction particle size distribution analyzer. As a result, it was found that 98% of the particles were accounted for by particles having a diameter of not more than 10 μm and the 50% average particle diameter (D50) was 1.2 μm.

Next, the glaze E was spray coated onto the same plate specimen as used in Example A1, followed by firing at 1100 to 1200° C. to obtain a sample.

For the sample, tests 1 to 3 described above were carried out. The results were as follows.

Test 1: The surface roughness of the glaze layer as the outermost layer was Ra=0.02 μm.

Test 2: The zeta potential of the glaze layer as the outermost layer in its surface was −62.4 mV.

Test 3: The sterilization was 99.990%, and the growth inhibition was 4.0. Based on these results, the sample was evaluated as having significant antimicrobial activity.

Comparative Example A1

The glaze A was spray coated onto the same plate specimen as used in Example A1, followed by firing at 1100 to 1200° C. to obtain a sample.

For the sample, tests 1 to 3 described above were carried out. The results were as follows.

Test 1: The surface roughness of the glaze layer as the outermost layer was Ra=0.10 μm.

Test 2: The zeta potential of the glaze layer as the outermost layer in its surface was −57.2 mV.

Test 3: The sterilization was 25%, and the growth inhibition was 0.12. Based on these results, the sample was evaluated as having no significant antimicrobial activity.

The results of evaluation in Examples A1 to A4 of the present invention and Comparative Example A1 are summarized in Table 2.

TABLE 2

| | Surface roughness, Ra | Zeta potential (pH:7) | Antimicrobial test Growth inhibition |
|---|---|---|---|
| Example A1 | 0.02 μm | −68.3 mV | 4.2 |
| Example A2 | 0.03 μm | −60.2 mV | 2.0 |
| Example A3 | 0.05 μm | −61.3 mV | 4.0 |
| Example A4 | 0.02 μm | −62.4 mV | 4.0 |
| Comparative Example A1 | 0.07 μm | −57.2 mV | 0.12 |

Example B1

A material for a glaze was provided which had the same composition as the material A for a glaze shown in Table 1, except that the $ZrO_2$ as the opacifier and the pigment were removed from the composition of the material A for a glaze and the content of the $Na_2O$ component was increased so that, for the monovalent metal component, the total weight of $K_2O$ and $Na_2O$ was 10% by weight based on the total weight of the glass component. This material for a glaze was melted at 1300 to 1400° C. in an electric furnace, and the melt was then quenched in water to obtain a glass frit. The glass frit was then stamp milled to obtain a powder. The powder thus obtained. (600 g), 3.0 g (0.5% by weight based on the glaze) of a silver powder, 400 g of water, and 1 kg of alumina balls were placed in a ceramic pot having a volume of 2 liters, and the mixture was then ball milled for about 24 hr. Thus, a glaze slurry as a glaze F was obtained. The particle diameter of the glaze F thus obtained was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze A was spray coated onto the same plate specimen as used in Example A1 to form a lower glaze layer, and the glaze F was then spray coated thereon to form an upper glaze layer, followed by firing at 1100 to 1200° C. to obtain a sample.

For the sample thus obtained, tests 1 to 5 described above were carried out. The results were as follows.

Test 1: The surface roughness of the glaze layer as the outermost layer was Ra=0.02 μm.

Test 2: The zeta potential of the glaze layer as the outermost layer in its surface was −68.3 mV.

Test 3: The sterilization was 99.994%, and the growth inhibition was 4.2. Based on these results, the sample was evaluated as having significant antimicrobial activity.

Test 4: Thirty five sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Example B2

A material for a glaze was provided which had the same composition as the material A for a glaze, except that the $ZrO_2$ as the opacifier and the pigment were removed from the composition of the material A for a glaze and, in addition, a sodium carbonate powder and a silver powder were added so that, for the monovalent metal component, the total weight of $K_2O$ and $Na_2O$ was 10% by weight based on the total weight of the glass component and the weight of silver was 0.5% by weight. The mixture was then stirred for about 3 hr. Thus, a glaze slurry as a glaze G was obtained. The particle diameter of the glaze G was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze A was spray coated onto the same plate specimen as used in Example A1 to form a lower glaze layer, and the glaze G was then spray coated thereon to form an upper glaze layer, followed by firing at 1100 to 1200° C. to obtain a sample.

For the sample thus obtained, tests 1 to 5 described above were carried out. The results were as follows.

Test 1: The surface roughness of the glaze layer as the outermost layer was Ra=0.03 μm.

Test 2: The zeta potential of the glaze layer as the outermost layer in its surface was −66.5 mV.

Test 3: The sterilization was 99.991%, and the growth inhibition was 4.0. Based on these results, the sample was evaluated as having significant antimicrobial activity.

Test 4: Thirty sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Example B3

A material for a glaze was provided which had the same composition as the material A for a glaze shown in Table 1, except that the $ZrO_2$ as the opacifier and the pigment were removed from the composition of the material A for a glaze and the content of the $Na_2O$ component was increased so that, for the monovalent metal component, the total weight of $K_2O$ and $Na_2O$ was 20% by weight based on the total weight of the glass component. The material for a glaze (2 kg), 10 g (0.5% by weight based on the glaze) of a silver powder, 1 kg of water, and 4 kg of balls were placed in a ceramic pot having a volume of 6 liters, and the mixture was then ball milled for about 20 hr. Thus, a glaze slurry as a glaze H was obtained. The particle diameter of the glaze H was measured with a laser diffraction particle size distribution analyzer. As a result, it was found that 63% of the particles were accounted for by particles having a diameter of not more than 10 μm and the 50% average particle diameter (D50) was 6.5 μm.

A material for a glaze was provided which had the same composition as the material A for a glaze shown in Table 1, except that the $ZrO_2$ as the opacifier and the pigment were removed from the composition of the material A for a glaze (for the monovalent metal component, the total weight of $K_2O$ and $Na_2O$=3.5% by weight based on the total weight of the glass component). This material for a glaze was melted at 1300 to 1400° C. in an electric furnace, and the melt was then quenched in water to obtain a glass frit. The glass frit was then stamp milled to obtain a powder. The powder thus obtained (600 g), 400 g of water, and 1 kg of alumina balls were placed in a ceramic pot having a volume of 2 liters, and the mixture was then ball milled for about 18 hr. Thus, a glaze slurry as a glaze I was obtained. The particle diameter of the glaze I was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze A was spray coated onto the same plate specimen as used in Example A1 to form a first glaze layer. The glaze I was then spray coated on the first glaze layer to form a second glaze layer. Thereafter, the glaze H was spray coated on the second glaze layer to form a third glaze layer, followed by firing at 1100 to 1200° C. to obtain a sample.

For the sample thus obtained, tests 1 to 5 described above were carried out. The results were as follows.

Test 1: The surface roughness of the glaze layer as the outermost layer was Ra=0.03 μm.

Test 2: The zeta potential of the glaze layer as the outermost layer in its surface was −72.0 mV.

Test 3: The sterilization was 99.9991%, and the growth inhibition was 5.0. Based on these results, the sample was evaluated as having significant antimicrobial activity.

Test 4: Forty five sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Example B4

The glaze A as used in Example A1 was spray coated onto the same plate specimen as used in Example A1 to form a lower glaze layer. A glaze slurry prepared by adding 0.5% by weight of silver to the glaze I prepared in Example B3 and then stirring the mixture for about 3 hr was then spray coated on the lower glaze layer to form an upper glaze layer. Further, 1.0 g of an aqueous sodium carbonate solution (concentration 10%) was sprayed thereon, followed by firing at 1100 to 1200° C. to obtain a sample.

For the sample thus obtained, tests 1 to 5 described above were carried out. The results were as follows.

Test 1: The surface roughness of the glaze layer as the outermost layer was Ra=0.03 μm.

Test 2: The zeta potential of the glaze layer as the outermost layer in its surface was −68.8 mV.

Test 3: The sterilization was 99.994%, and the growth inhibition was 4.2. Based on these results, the sample was evaluated as having significant antimicrobial activity.

Test 4: Sixty sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Example B5

An aqueous sodium carbonate solution (concentration 20%) (1.0 g) was sprayed on the same plate specimen as used in Example A1. Thereafter, the glaze A as used in Comparative Example A1 was spray coated onto the plate specimen to form a lower glaze layer. A glaze slurry prepared by adding 0.5% by weight of silver to the glaze I prepared in Example B3 and then stirring the mixture for about 3 hr was then spray coated on the lower glaze layer to form an upper glace layer, followed by firing at 1100 to 1200° C. to obtain a sample.

For the sample thus obtained, tests 1 to 5 described above were carried out. The results were as follows.

Test 1: The surface roughness of the glaze layer as the outermost layer was Ra=0.03 μm.

Test 2: The zeta potential of the glaze layer as the outermost layer in its surface was −67.5 mV.

Test 3: The sterilization was 99.990%, and the growth inhibition was 4.0. Based on these results, the sample was evaluated as having significant antimicrobial activity.

Test 4: Forty five sec after-the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

The results of evaluation in Examples B1 to B5 of the present invention are summarized in Table 3.

TABLE 3

|  | Surface roughness | Stain resistance test | | Zeta potential | Antimicrobial test |
| --- | --- | --- | --- | --- | --- |
|  | Ra | In water | In air | (pH: 7) | Growth inhibition |
| Example B1 | 0.02 μm | 35 sec | A | −68.3 mV | 4.2 |
| Example B2 | 0.03 μm | 30 sec | A | −66.5 mV | 4.0 |
| Example B3 | 0.03 μm | 35 sec | A | −72.0 mV | 5.0 |
| Example B4 | 0.03 μm | 60 sec | A | −68.8 mV | 4.2 |
| Example B5 | 0.03 μm | 45 sec | A | −67.5 mV | 4.0 |

Reference)
Zeta potential of *E. coli* at pH 7: −41 mV
Note)
"Stain resistance test (in air)"
A: The oil film was substantially completely run down.
B: A part of the oil film stayed on the plate specimen.
C: The oil film in its large part stayed on the plate specimen.

Example C1

The material A for a glaze (for the monovalent metal component, the total weight of $K_2O$ and $Na_2O$=3.5% by weight based on the total weight of the glass component; the content of $Li_2O$ component=0% by weight) (2 kg), 1 kg of water, and 4 kg of balls were placed in a ceramic pot having a volume of 6 liters, and the mixture was then ball milled for about 18 hr. Thus, a glaze slurry as a glaze J was obtained. The particle diameter of the glaze J was measured with a laser diffraction particle size distribution analyzer. As a result, it was found that 65% of the particles were accounted for by particles having a diameter of not more than 10 μm and the 50% average particle diameter (D50) was 5.8 μm.

The material for a glaze was provided which had the same composition as the material A for a glaze, except that the $ZrO_2$ as the opacifier and the pigment were removed from the composition of the material A for a glaze and the content of the $Na_2O$ component was increased (for the monovalent metal component, the total weight of $K_2O$ and $Na_2O$=10% by weight based on the total weight of the glass component; the content of $Li_2O$ component=0% by weight). This material for a glaze was melted at 1300 to 1400° C. in an electric furnace, and the melt was then quenched in water to obtain a glass frit. The glass frit was then stamp milled to obtain a powder. The powder thus obtained (600 g), 400 g of water, and 1 kg of alumina balls were placed in a ceramic pot having a volume of 2 liters, and the mixture was then ball milled for about 24 hr. Thus, a glaze slurry as a glaze K was obtained. The particle diameter of the glaze K thus obtained was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze J was spray coated onto the same plate specimen as used in Example A1 to form a lower glaze layer, and the glaze K was then spray coated thereon to form an upper glaze layer, followed by firing at 1100 to 1200° C. to obtain a sample.

For the sample thus obtained, tests 1, 2 and 4 to 7 described above were carried out. The results were as follows.

Test 1: The surface roughness of the glaze layer as the outermost layer was Ra=0.04 μm.

Test 2: The zeta potential of the glaze layer as the outermost layer in its surface was −68.3 mV.

Test 4: Thirty five sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Test 6: The glaze layer had a satisfactory appearance, that is, when visually inspected, was free from any defect, such as cracks, and did not suffer from any problem as a sanitary ware.

Figure 9:
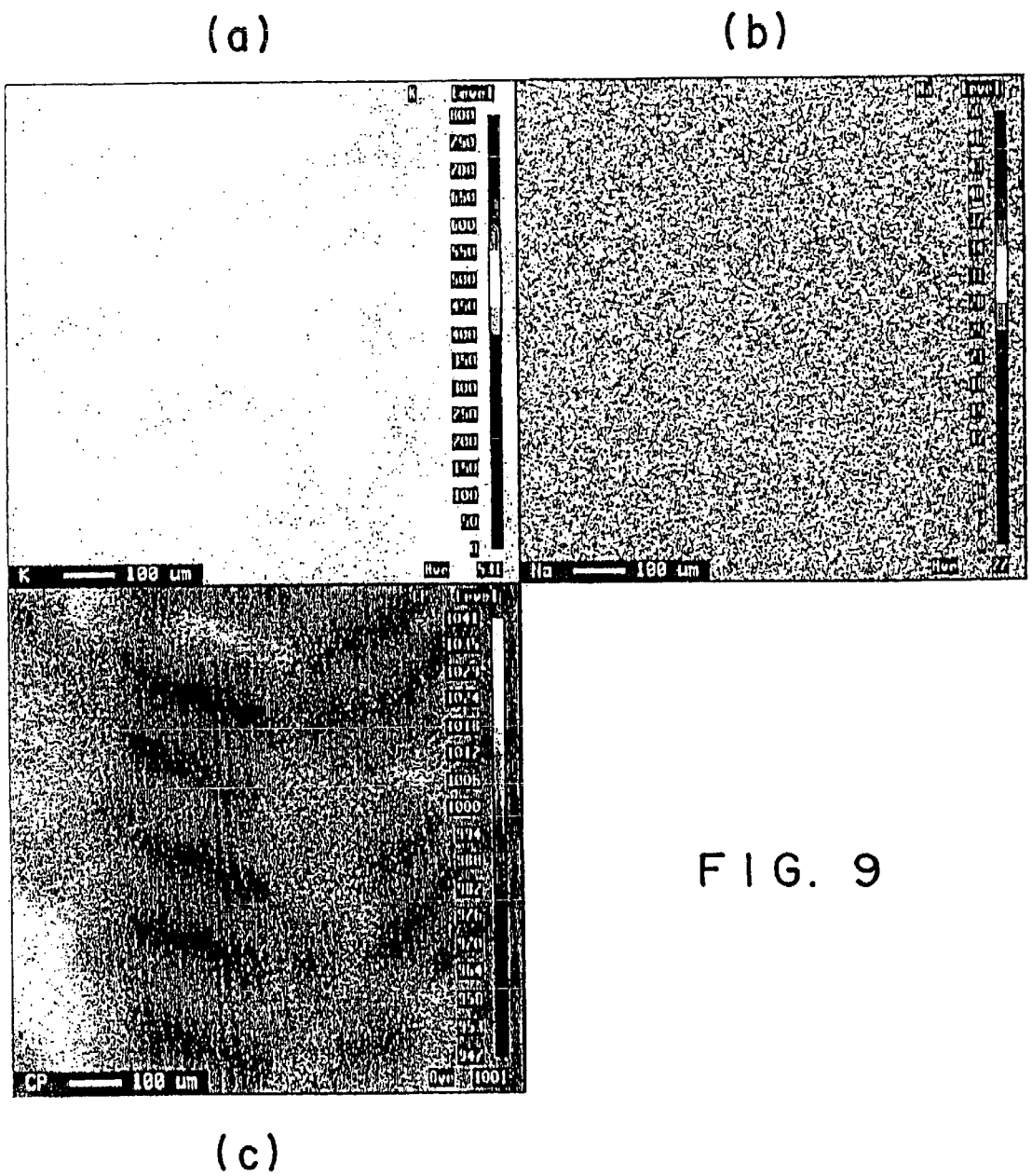
FIG. 9 is a reflection electron composition image and a mapping image of the surface of a glaze layer, in a sanitary ware (Example C1) according to the present invention, as measured by an electron probe microanalyzer (JXA 8900RL, manufactured by Japan Electric Optical Laboratory), wherein (a) shows the distribution of potassium, a whiter portion representing a higher potassium concentration, (b) shows the distribution of sodium, a whiter portion representing a higher sodium concentration, and (c) shows a reflection electron composition image with $ZrO_2$ being present in a white portion.

Test 7: A reflection electron composition image and a mapping image on the surface of the glaze layer are shown in FIG. 9. As can be seen from FIG. 9, $ZrO_2$ as the opacifier and silica particles remaining undissolved were absent on the surface of the glaze layer, and builder components (for example, sodium and potassium) were observed over the whole surface of the glaze layer, indicating that builder components (for example, sodium and potassium) could be released over the whole surface of the glaze layer.

Example C2

A material for a glaze was prepared which had the same composition as the material A for a glaze, except that the $ZrO_2$ as the opacifier and the pigment were removed from the composition of the material A for a glaze (for the monovalent metal component, the total weight of $K_2O$ and $Na_2O$=3.6% by weight based on the total weight of the glass component; the content of $Li_2O$ component=0% by weight). This material for a glaze was melted at 1300 to 1400° C. in an electric furnace, and the melt was then quenched in water to obtain a glass frit. The glass frit was then stamp milled to obtain a powder. The powder thus obtained (600 g), 400 g of water, and 1 kg of alumina balls were placed in a ceramic pot having a volume of 2 liters, and the mixture was then ball milled for about 18 hr. A sodium carbonate powder was added to the glaze slurry thus obtained (for the monovalent metal component, the total weight of $K_2O$ and $Na_2O$=10% by weight based on the total weight of the glass component; the content of $Li_2O$ component=0% by weight), and the mixture was stirred for about one hr. Thus, a glaze slurry as a glaze L was obtained. The particle diameter of the glaze L was measured with a laser diffraction particle size distribution analyzer. As a result, it was found that 68% of the particles were accounted for by particles having a diameter of not more than 10 µm and the 50% average particle diameter (D50) was 6.0 µm.

Next, the glaze J was spray coated onto the same plate specimen as used in Example A1 to form a lower glaze layer, and the glaze L was then spray coated thereon to form an upper glaze layer, followed by firing at 1100 to 1200° C. to obtain a sample.

For the sample thus obtained, tests 1, 2 and 4 to 6 described above were carried out. The results were as follows.

Test 1: The surface roughness of the glaze layer as the outermost layer was Ra=0.03 µm.

Test 2: The zeta potential of the glaze layer as the outermost layer in its surface was −66.5 mV.

Test 4: Thirty sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Test 6: The glaze layer had a satisfactory appearance, that is, when visually inspected, was free from any defect, such as cracks, and did not suffer from any problem as a sanitary ware.

Example C3

A material for a glaze was provided which had the same composition as the material A for a glaze, except that the $ZrO_2$ as the opacifier and the pigment were removed from the composition of the material A for a glaze and the content of the $Na_2O$ component was increased (for the monovalent metal component, the total weight of $K_2O$ and $Na_2O$ was 20% by weight based on the total weight of the glass component; the content of the $Li_2O$ component=0% by weight). The material for a glaze (2 kg), 1 kg of water, and 4 kg of balls were placed in a ceramic pot having a volume of 6 liters, and the mixture was then ball milled for about 20 hr. Thus, a glaze slurry as a glaze M was obtained. The particle diameter of the glaze M was measured with a laser diffraction particle size distribution analyzer. As a result, it was found that 63% of the particles were accounted for by particles having a diameter of not more than 10 µm and the 50% average particle diameter (D50) was 6.5 µm.

Separately, a material for a glaze was provided which had the same composition as the material A for a glaze, except that the $ZrO_2$ as the opacifier and the pigment were removed from the composition of the material A for a glaze (for the monovalent metal component, the total weight of $K_2O$ and $Na_2O$, was 3.6% by weight based on the total weight of the glass component; the content of $Li_2O$ component=0% by weight). This material for a glaze was melted at 1300 to 1400° C. in an electric furnace, and the melt was then quenched in water to obtain a glass frit. The glass frit was then stamp milled to obtain a powder. The powder thus obtained (600 g), 400 g of water, and 1 kg of alumina balls were placed in a ceramic pot having a volume of 2 liters, and the mixture was then ball milled for about 18 hr. Thus, a glaze slurry as a glaze N was obtained. The particle diameter of the glaze N was measured with a laser diffraction particle size distribution analyzer. As a result, it was found that 68% of the particles were accounted for by particles having a diameter of not more than 10 µm and the 50% average particle diameter (D50) was 6.0 µm.

Next, the glaze J was spray coated onto the same plate specimen as used in Example A1 to form a first glaze layer. The glaze N was then spray coated on the first glaze layer to form a second glaze layer. Thereafter, the glaze M was then spray coated on the second glaze layer to form a third glaze layer. The plate specimen thus obtained was fired at 1100 to 1200° C. to obtain a sample.

For the sample thus obtained, tests 1, 2 and 4 to 6 described above were carried out. The results were as follows.

Test 1: The surface roughness of the glaze layer as the outermost layer was Ra=0.06 µm.

Test 2: The zeta potential of the glaze layer as the outermost layer in its surface was −72.0 mV.

Test 4: Forty five sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Test 6: The glaze layer had a satisfactory appearance, that is, when visually inspected, was free from any defect, such as cracks, and did not suffer from any problem as a sanitary ware.

Example C4

The same plate specimen as used in Example A1 was prepared. The glaze J as used in Example C1 was spray coated onto the plate specimen to form a lower glaze layer. The glaze N as used in Example C3 was then spray coated onto the lower glaze layer to from an upper glaze layer. Further, 1.0 g of an aqueous sodium carbonate solution (concentration 10%) was sprayed thereon, followed by firing at 1100 to 1200° C. to obtain a sample.

For the sample thus obtained, tests 1, 2 and 4 to 6 described above were carried out. The results were as follows.

Test 1: The surface roughness of the glaze layer as the outermost layer was Ra=0.04 µm.

Test 2: The zeta potential of the glaze layer as the outermost layer in its surface was −68.8 mV.

Test 4: Sixty sec after the submergence, the oil film was substantially completely separated from the glaze surface.

Test 5: The oil stain created by dropping the oil on the surface of the glaze layer was substantially completely run down, although a very small amount of oil droplets were present on the surface of the glaze layer.

Test 6: The glaze layer had a satisfactory appearance, that is, when visually inspected, was free from any defect, such as cracks, and did not suffer from any problem as a sanitary ware.

Example 5

Sodium carbonate, potassium carbonate, and lithium carbonate powders were added to the glaze slurry N prepared in Example C3, and the mixture was stirred for about one hr (for the monovalent metal component, the total weight of $K_2O$ and $Na_2O$=7.2% by weight based on the total weight of the glass component; the content of $Li_2O$ component=0.7% by weight). Thus, a glaze slurry as a glaze O was obtained. The particle diameter of the glaze O was measured with a laser diffraction particle size distribution analyzer. As a result, it was found that 68% of the particles were accounted for by particles having a diameter of not more than 10 μm and the 50% average particle diameter (D50) was 6.0 μm.

Next, the glaze J was spray coated onto the same plate specimen as used in Example A1 to form a lower glaze layer, and the glaze O was spray coated thereon to form an upper glaze layer, followed by firing at 1100 to 1200° C. to obtain a sample.

For the sample thus obtained, tests 1, 2 and 4 to 6 described above were carried out. The results were as follows.

Test 1: The surface roughness of the glaze layer as the outermost layer was Ra=0.04 μm.

Test 2: The zeta potential of the glaze layer as the outermost layer in its surface was −63.2 mV.

Test 4: Fifty sec after the submergence, the oil film was substantially completely separated from the glaze surface.

Comparative Example C1

The glaze J was spray coated onto the same plate specimen as used in Example A1, followed by firing at 1100 to 1200° C. to obtain a sample.

For the sample thus obtained, tests 1, 2 and 4 to 7 described above were carried out. The results were as follows.

Test 1: The surface roughness of the glaze layer as the outermost layer was Ra=0.10 μm.

Test 2: The zeta potential of the glaze layer as the outermost layer in its surface was −51.5 mV.

Test 4: Even 5 min after the submergence, the oil film still stayed on a part of the glaze surface.

Test 5: A wide oil film stayed in a belt in the vertical direction of the surface of the glaze layer.

Test 6: The glaze layer had a satisfactory appearance, that is, when visually inspected, was free from any defect, such as cracks, and did not suffer from any problem as a sanitary ware.

Figure 10:
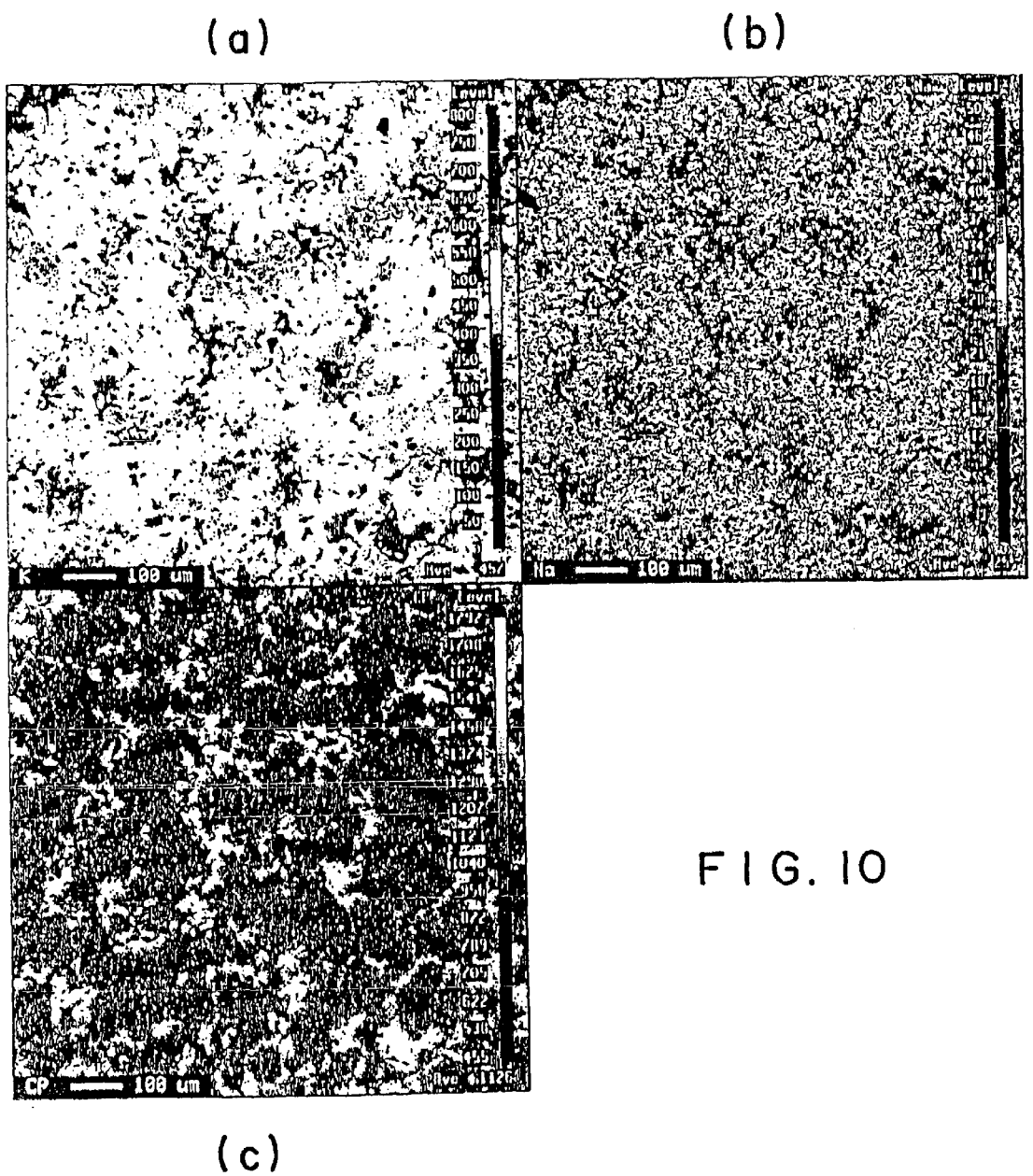
FIG. 10 is a reflection electron composition image and a mapping image of the surface of a glaze layer, in a conventional sanitary ware (Comparative Example C1), as measured by an electron probe microanalyzer (JXA 8900RL, manufactured by Japan Electric Optical Laboratory), wherein (a) shows the distribution of potassium, a whiter portion representing a higher potassium concentration, (b) shows the distribution of sodium, a whiter portion representing a higher sodium concentration, and (c) shows a reflection electron composition image with $ZrO_2$ being present in a white portion.

Test 7: A reflection electron composition image and a mapping image on the surface of the glaze layer are shown in FIG. 10. As can be seen from FIG. 10, $ZrO_2$ as the opacifier and silica particles remaining undissolved were present in a dispersed state on the whole surface of the glaze layer, and builder components (for example, sodium and potassium) were absent on portions where the opacifier and the silica particles were present. This suggests that $ZrO_2$ as the opacifier and the silica particles remaining undissolved inhibited the release of builder components (for example, sodium and potassium) on the surface of the layer.

The evaluation results of Examples C1 to C5 and Comparative Example C1 are summarized in Table 4.

TABLE 4

|  | Appearance (visual inspection) | Stain resistance test In water | Stain resistance test In air | Zeta potential |
| --- | --- | --- | --- | --- |
| Example C1 | A | 35 sec | A | −68.3 mV |
| Example C2 | A | 30 sec | A | −66.5 mV |
| Example C3 | A | 35 sec | A | −72.0 mV |
| Example C4 | A | 60 sec | A | −68.8 mV |
| Example C5 | A | 50 sec | A | −63.2 mV |
| Comparative Example C1 | A | Unseparable | C | −57.2 mV |

Reference)
Zeta potential of *E. coli* at pH 7: −41 mV
Note)
"Evaluation of appearance"
A: There was no defect on the surface of the glaze layer.
B: There was a defect on a part of the surface of the glaze layer.
C: There was a defect on the whole surface of the glaze layer.
"Stain resistance test (in air)"
A: The oil film was substantially completely run down.
B: A part of the oil film stayed on the plate specimen.
C: The oil film in its large part stayed on the plate specimen.

Test 5: The oil stain created by dropping the oil on the surface of the glaze layer was substantially completely run down, although a very small amount of oil droplets were present on the surface of the glaze layer.

Test 6: The glaze layer had a satisfactory appearance, that is, when visually inspected, was free from any defect, such as cracks, and did not suffer from any problem as a sanitary ware.

What is claimed is:

1. A sanitary ware comprising a sanitary ware body and a glaze layer as an outermost layer of the sanitary ware;
the glaze layer as the outermost layer is substantially free from opacifiers and/or pigments or, alternatively, an average particle diameter of particles which comprise the glaze layer as the outermost layer is not more than 6.0 μm if the glaze layer as the outermost layer contains opacifiers and/or pigments; and the surface of the glaze layer as the outermost layer has a surface roughness Ra of less than 0.07 µm as measured with a stylus type surface roughness tester according to JIS B 0651 (1996), furthermore;

the content, as measured by X-ray photoelectron spectroscopy from the surface of the outermost layer, of a monovalent metal component and/or a metal component having a measure of the electronegativity based on Pouling's rule of not more than 1 in the glaze layer as the outermost layer is less than 20% by weight in terms of oxide based on the whole metal component in the glaze layer as the outermost layer;

wherein the metal component is releasable evenly and continuously, over the whole surface of the glaze layer as the outermost layer, in an amount effective to impart a self-cleaning function for releasing stains or soils to the surface of the glaze layer as the outermost layer, and the metal component is supplied from the glaze layer as the outermost layer and/or the sanitary ware body to the whole surface of the glaze layer as the outermost layer.

2. The sanitary ware according to claim 1 wherein the zeta potential at pH 7 of the surface of the glaze layer as the outermost layer is negative and has an absolute value of not less than 60 mV.

3. The sanitary ware according to claims 1 or 2 wherein the metal component is contained in at least the sanitary ware body.

4. The sanitary ware according to claim 3, wherein the metal component is contained in the glaze layer as the outermost layer and the sanitary ware body.

5. The sanitary ware according to claim 1, wherein, as measured by X-ray photoelectron spectroscopy from the surface of the outermost layer, the content of the metal component in the glaze layer as the outermost layer is not less than 7% by weight in terms of oxide based on the whole metal component in the glaze layer as the outermost layer.

6. The sanitary ware according to claim 1, wherein the content of the metal component in the sanitary ware body is not less than 5% by weight in terms of oxide based on the whole metal component in the sanitary ware body.

7. The sanitary ware according to claim 1, wherein the glaze layer as the outermost layer consists essentially of an amorphous component.

8. The sanitary ware according to claim 1, wherein the glaze layer as the outermost layer consists essentially of a hydratable material.

9. The sanitary ware according to claim 1, wherein the glaze layer as the outermost layer further comprises an antimicrobial metal.

10. The sanitary ware according to claim 1, wherein the antimicrobial metal is silver and/or copper and, as measured by X-ray photoelectron spectroscopy from the surface of the glaze layer as the outermost layer, the content of the antimicrobial metal in the glaze layer as the outermost layer is not less than 0.1% by weight in terms of oxide based on the whole metal component.

11. A sanitary ware comprising a sanitary ware body and a glaze layer as an outermost layer of the sanitary ware;

the glaze layer as the outermost layer is a transparent glaze layer which is substantially free from the opacifiers and/or pigments, and the sanitary ware further comprises a colored glaze layer as an intermediate layer provided between the sanitary ware body and the glaze layer as the outermost layer, and the surface of the glaze layer as the outermost layer has a surface roughness Ra of less than 0.07 µm as measured with a stylus type surface roughness tester according to JIS B 0651 (1996), furthermore;

the content, as measured by X-ray photoelectron spectroscopy from the surface of the outermost layer, of a monovalent metal component and/or a metal component having a measure of the electronegatively based on Pouling's rule of not more than 1 in the glaze layer as the outermost layer is less than 30% by weight in terms of oxide based on the whole metal component in the glaze layer as the outermost layer;

wherein the metal component is releasable evenly and continuously, over the whole surface of the glaze layer as the outermost layer, in an amount effective to impart a self-cleaning function for releasing stains or soils to the surface of the glaze layer as the outermost layer, and the metal component is supplied from the glaze layer as the outermost layer and/or the sanitary ware body to the whole surface of the glaze layer as the outermost layer.

12. The sanitary ware according to claim 11, wherein the zeta potential of the surface of the glaze layer as the outermost layer at pH 7 is negative and has an absolute value of not less than 60 mV.

13. The sanitary ware according to claim 11 or 12, wherein the metal component is contained in at least the glaze layer as the outermost layer.

14. The sanitary ware according to claim 11, wherein the metal component is contained in the sanitary ware body and the glaze layer as the intermediate layer.

15. The sanitary ware according to claim 11, wherein, as measured by X-ray photoelectron spectroscopy from the surface of the glaze layer as the outermost layer, the content of the metal component in the glaze layer as the outermost layer is not less than 7% by weight in terms of oxide based on the whole metal component in the glaze layer as the outermost layer.

16. The sanitary ware according to claim 11, wherein the content of the metal component in the sanitary ware body is not less than 5% by weight in terms of oxide based on the whole metal component in the sanitary ware body.

17. The sanitary ware according to claim 11, wherein the glaze layer as the outermost layer consists essentially of an amorphous component.

18. The sanitary ware according to claim 11, wherein the glaze layer as the outermost layer consists essentially of a hydratable material.

19. The sanitary ware according to claim 11, wherein the glaze layer as the outermost layer further comprises an antimicrobial metal.

20. The sanitary ware according to claim 11, wherein the antimicrobial metal is silver and/or copper and, as measured by X-ray photoelectron spectroscopy from the surface of the glaze layer as the outermost layer, the content of the antimicrobial metal in the glaze layer as the outermost layer is not less than 0.1% by weight in terms of oxide based on the whole metal component.

21. A sanitary ware comprising a sanitary ware body and a glaze layer as an outermost layer of the sanitary ware;

the sanitary ware further comprises a metal component layer which comprises the metal component as a main component, between the sanitary ware body and the glaze layer as the outermost layer;

the glaze layer as the outermost layer is substantially free from opacifiers and/or pigments or, alternatively, an average particle diameter of particles which comprise the glaze layer as the outermost layer is not more than 6.0 µm if the glaze layer as the outermost layer contains opacifiers and/or pigments, and the surface of the glaze layer as the outermost layer has a surface roughness Ra of less than 0.07 µm as measured with a stylus type surface roughness tester according to JIS B 0651 (1996);

whereby the metal component is provided so as to be releasable evenly and continuously, over the whole surface of the glaze layer as the outermost layer, in such an amount large enough to impart a self-cleaning function for releasing stains or soils to the surface of the glaze layer as the outermost layer, and the metal component is suppliable from the glaze layer as the outermost layer and/or the sanitary ware body and the metal component layer to the whole surface of the glaze layer as the outermost layer.

22. The sanitary ware according to claim 21, wherein the zeta potential at pH 7 of the surface of the glaze as the outermost layer is negative and has an absolute valve of not less than 60 mV.

23. The sanitary ware according to claim 21 or 22, wherein the glaze layer as the outermost layer consists essentially of an amorphous component.

24. The sanitary ware according to claim 21, wherein the glaze layer as the outermost layer consists essentially of a hydratable material.

25. The sanitary ware according to claim 21, wherein the glaze layer as the outermost layer further comprises an antimicrobial metal.

26. The sanitary ware according to claim 25, wherein the antimicrobial metal is silver and/or copper and, as measured by X-ray photoelectron spectroscopy from the surface of the glaze layer as the outermost layer, the content of the antimicrobial metal in the glaze layer as the outermost layer is not less than 0.1% by weight in terms of oxide based on the whole metal component.

27. A sanitary ware comprising a sanitary ware body and a glaze layer as an outermost layer of the sanitary ware;

the glaze layer as the outermost layer is a transparent glaze layer which is substantially free from opacifiers and/or pigments;

the sanitary ware further comprises, provided between the sanitary ware body and the glaze layer as the outermost layer, a colored glaze layer as an intermediate layer provided on the sanitary ware body side and metal component layer which comprises the metal component as a main component, provided on the side of the glass layer as the outermost layer, and the surface of the glaze layer as the outermost layer has a surface roughness Ra of less than 0.07 μm as measured with a stylus type surface roughness tester according to JIS B 0651 (1996);

whereby the metal component is provided so as to be releasable evenly and continuously, over the whole surface of the glaze layer as the outermost layer, in such an amount large enough to impart a self-cleaning function for releasing stains or soils to the surface of the glaze layer as the outermost layer, and the metal component is suppliable from the glaze layer as the outermost layer and/or the sanitary ware body and the metal component layer to the whole surface of the glaze layer as the outermost layer.

28. The sanitary ware according to claim 27, wherein the zeta potential at pH 7 of the surface of the glaze layer as the outermost layer is negative and has an absolute value of not less than 60 mV.

29. The sanitary ware according to claim 27 or 28, wherein the glaze layer as the outermost layer consists essentially of an amorphous component.

30. The sanitary ware according to claim 27, wherein the glaze layer as the outermost layer consists essentially of a hydratable material.

31. The sanitary ware according to claim 27, wherein the glaze layer as the outermost layer further comprises an antimicrobial metal.

32. The sanitary ware according to claim 31, wherein the antimicrobial metal is silver and/or copper and, as measured by X-ray photoelectron spectroscopy from the surface of the glaze layer as the outermost layer, the content of the antimicrobial metal in the glaze layer as the outermost layer is not less than 0.1% by weight in terms of oxide based on the whole metal component.

33. A sanitary ware comprising a sanitary ware body and a glaze layer as an outermost layer of the sanitary ware;

the sanitary ware further comprises, provided between the sanitary ware body and the glaze layer as the outermost layer, a metal component layer which comprises the metal component as a main component, provided on the sanitary ware body side and a colored glaze layer as an intermediate layer provided on the side of the glaze layer as the outermost layer;

the glaze layer as the outermost layer is a transparent glaze layer which is substantially free from opacifiers and/or pigments, and the surface of the glaze layer as the outermost layer has a surface roughness Ra of less than 0.07 μm as measured with a stylus type surface roughness tester according to JIS B 0651 (1996);

whereby the metal component is provided so as to be releasable evenly and continuously, over the whole surface of the glaze layer as the outermost layer, in such an amount large enough to impart a self-cleaning function for releasing stains or soils to the surface of the glaze layer as the outermost layer, and the metal component is suppliable from the glaze layer as the outermost layer and/or the sanitary ware body and the metal component layer to the whole surface of the glaze layer as the outermost layer.

34. The sanitary ware according to claim 33, wherein the zeta potential at pH 7 of the surface of the glaze layer as the outermost layer is negative and has an absolute value of not less than 60 mV.

35. The sanitary ware according to claim 33 or 34, wherein the glaze layer as the outermost layer consists essentially of an amorphous component.

36. The sanitary ware according to claim 33, wherein the glaze layer as the outermost layer consists essentially of a hydratable material.

37. The sanitary ware according to claim 33, wherein the glaze layer as the outermost layer further comprises an antimicrobial metal.

38. The sanitary ware according to claim 37, wherein the antimicrobial metal is silver and/or copper and, as measured by X-ray photoelectron spectroscopy from the surface of the glaze layer as the outermost layer, the content of the antimicrobial metal in the glaze layer as the outermost layer is not less than 0.1% by weight in terms of oxide based on the whole metal component.

39. The sanitary ware according to any one of claims 1, 11, 21, 27 or 33, which is a toilet or a urinal.

40. The sanitary ware according to any one of claims 1, 11, 21, 27 or 33, which is a washbowl.

41. The sanitary ware according to any one of claims 1, 11, 21, 27 or 33, which is a strainer for urinals.

42. The sanitary ware according to any one of claims 1, 11, 21, 27 or 33, which is a toilet.

43. The sanitary ware according to any one of claims 1, 11, 21, 27 or 33, which is a urinal.

44. The sanitary ware according to any one of claims 1, 11, 21, 27 or 33, which is a flush tank for toilets or urinals.

45. The sanitary ware according to any one of claims 1, 11, 21, 27 or 33, which is a wash hand basin.

46. A sanitary ware comprising:

a sanitary ware body;

a glaze layer as an outermost layer of the sanitary ware; and a metal component layer, comprising the metal component as a main component, provided between the sanitary ware body and the outermost layer.

47. The sanitary ware of claim 46 further comprising a colored glaze layer provided between the sanitary ware body and the outermost layer.

48. The sanitary ware of claim 47 wherein the colored glaze layer is provided between the sanitary ware body and the metal component layer.

49. The sanitary ware of claim 47 wherein the colored glaze layer is provided between the outermost glaze layer and the metal component layer.

* * * * *

UNITED STATES PATENT AND TRADEMARK OFFICE
CERTIFICATE OF CORRECTION

PATENT NO.    : 6,514,622 B1  
DATED         : February 4, 2003  
INVENTOR(S)   : Hayakawa et al.

It is certified that error appears in the above-identified patent and that said Letters Patent is hereby corrected as shown below:

Column 27,  
Line 50, should read as:  
The sanitary ware according to claim 1,"

Signed and Sealed this

Tenth Day of June, 2003

JAMES E. ROGAN  
*Director of the United States Patent and Trademark Office*